(12) United States Patent
Park et al.

(10) Patent No.: US 12,463,843 B2
(45) Date of Patent: Nov. 4, 2025

(54) SERVER AND CONTROL METHOD FOR DETERMINING A TARGET ELECTRONIC DEVICE

(71) Applicant: Samsung Electronics Co., Ltd., Suwon-si (KR)

(72) Inventors: Mooserk Park, Suwon-si (KR); Ara Cho, Suwon-si (KR); Sukwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/969,211

(22) Filed: Oct. 19, 2022

(65) Prior Publication Data

US 2023/0045302 A1    Feb. 9, 2023

Related U.S. Application Data

(63) Continuation of application No. PCT/KR2021/004354, filed on Apr. 7, 2021.

(30) Foreign Application Priority Data

May 27, 2020   (KR) ........................ 10-2020-0063921

(51) Int. Cl.
 *G06F 15/16*  (2006.01)
 *H04L 12/28*  (2006.01)
 *H04L 67/125* (2022.01)

(52) U.S. Cl.
 CPC ........ *H04L 12/282* (2013.01); *H04L 12/2816* (2013.01); *H04L 12/2827* (2013.01); *H04L 67/125* (2013.01)

(58) Field of Classification Search
 CPC ............. H04L 12/2827; H04L 12/2816; H04L 12/282
 (Continued)

(56) References Cited

U.S. PATENT DOCUMENTS 9,781,245 B2   10/2017  Miller
10,248,086 B2   4/2019  Lee et al.
(Continued)

FOREIGN PATENT DOCUMENTS

CN    109427333 A    3/2019
CN    111052002 A    4/2020
(Continued)

OTHER PUBLICATIONS

Extended European Search Report dated Aug. 10, 2023, issued in European Patent Application No. 21814195.0.
(Continued)

*Primary Examiner* — Kaylee J Huang
(74) *Attorney, Agent, or Firm* — Jefferson IP Law, LLP

(57) ABSTRACT

A server and a control method are provided. The server includes a communication interface for performing communication with a plurality of electronic devices and a plurality of sensing devices, and at least one processor configured to identify a sensing device corresponding to a user's location from among the plurality of sensing devices based on information received from at least one of the plurality of electronic devices and the plurality of sensing devices through the communication interface, and control the communication interface to transmit a signal for controlling a target electronic device among the plurality of electronic devices to the target electronic device based on sensing data received from the identified sensing device.

16 Claims, 20 Drawing Sheets

(58) Field of Classification Search
USPC .................................. 709/201, 203, 217, 227
See application file for complete search history.

(56) References Cited

U.S. PATENT DOCUMENTS

| | | | |
|---|---|---|---|
| 10,692,495 | B2 | 6/2020 | Woo et al. |
| 10,887,124 | B2 | 1/2021 | Jung |
| 2013/0173696 | A1 | 7/2013 | Lee et al. |
| 2015/0106061 | A1* | 4/2015 | Yang .................... H04L 12/2827 702/188 |
| 2015/0163411 | A1* | 6/2015 | McCarthy, III ........ G08B 25/08 348/143 |
| 2016/0335865 | A1* | 11/2016 | Sayavong ........... G08B 13/2491 |
| 2017/0048078 | A1* | 2/2017 | Hou .................... H04L 12/2827 |
| 2017/0212485 | A1* | 7/2017 | Lee ........................... F24F 11/62 |
| 2018/0285065 | A1* | 10/2018 | Jeong ....................... G06F 3/167 |
| 2018/0323996 | A1* | 11/2018 | Roman ................. H04L 12/282 |
| 2019/0081810 | A1* | 3/2019 | Jung .................... H04L 12/2827 |
| 2019/0104595 | A1 | 4/2019 | Rosen et al. |
| 2019/0341042 | A1 | 11/2019 | Kim et al. |
| 2020/0106835 | A1 | 4/2020 | Deluca et al. |
| 2022/0052867 | A1* | 2/2022 | Nakano ................. H04W 4/023 |
| 2022/0414753 | A1* | 12/2022 | Poole ................. G06Q 30/0635 |

FOREIGN PATENT DOCUMENTS

| | | |
|---|---|---|
| JP | 6241767 B2 | 12/2017 |
| KR | 10-0466857 B1 | 1/2005 |
| KR | 10-0494175 B1 | 6/2005 |
| KR | 10-2013-0077733 A | 7/2013 |
| KR | 10-1624360 A1 | 5/2016 |
| KR | 10-2017-0088649 A | 8/2017 |
| KR | 10-2018-0027256 A | 3/2018 |
| KR | 10-2018-0071932 A | 6/2018 |
| KR | 10-2019-0034384 A | 4/2019 |
| KR | 10-2019-0067294 A | 6/2019 |
| KR | 10-2042194 B1 | 11/2019 |
| KR | 10-2075507 B1 | 2/2020 |
| KR | 10-2091243 B1 | 3/2020 |
| WO | 03-049379 A1 | 6/2003 |

OTHER PUBLICATIONS

Chinese Office Action dated Mar. 7, 2025, issued in a Chinese Patent Application No. 202180038309.8.
Korean Office Action dated May 28, 2025, issued in a Korean Patent Patent Application No. 10-2020-0063921.
Chinese Office Action dated Jul. 25, 2025, issued in a Chinese Patent Patent Application No. 202180038309.8.
European Office Action dated Sep. 15, 2025, issued in a European Patent Application No. 21814195.0.

* cited by examiner

FIG. 6

| Area | Device | Sensing Data |
|---|---|---|
| Room 1 (21) | Temperature Sensor 1 | Temperature |
| Room 1 (21) | Air Conditioner (IR receiver) | IR signal |
| Room 2 (22) | Temperature Sensor 2 | Temperature |
| Room 2 (22) | TV (Mic, IR receiver) | Voice, IR signal |
| Room 3 (23) | Temperature Sensor 3 | Temperature |
| Room 3 (23) | AI Speaker (Mic) | Voice |

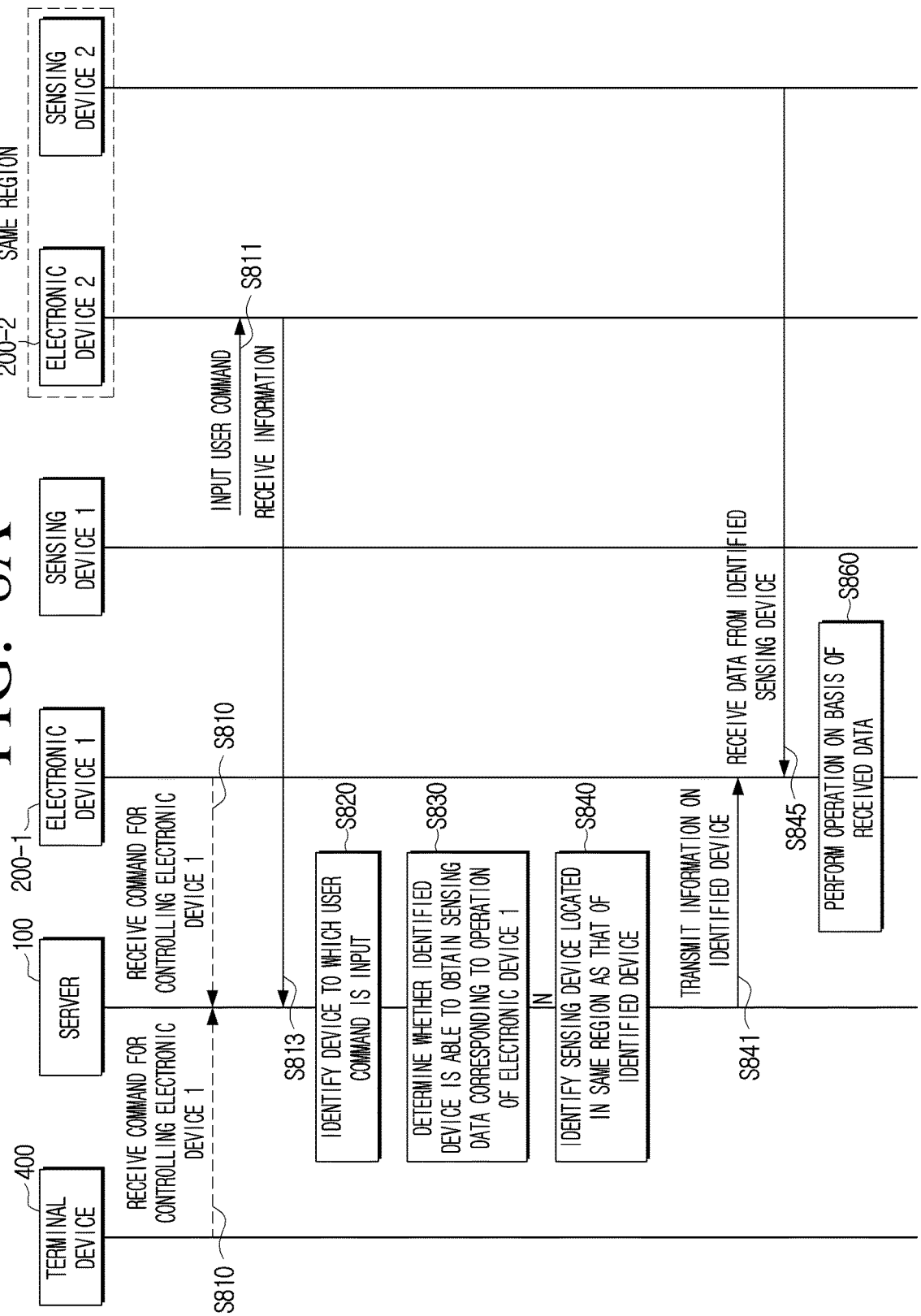

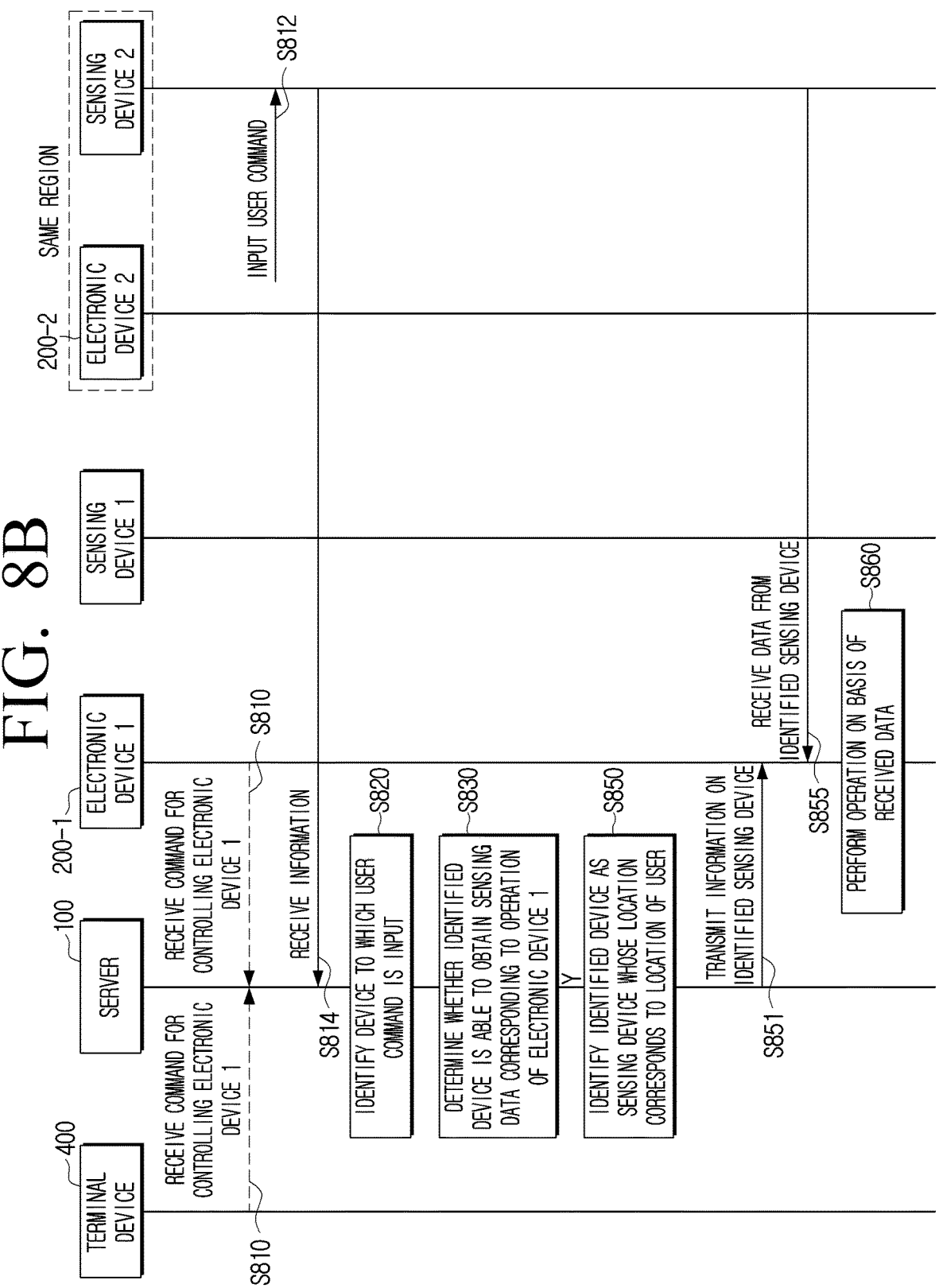

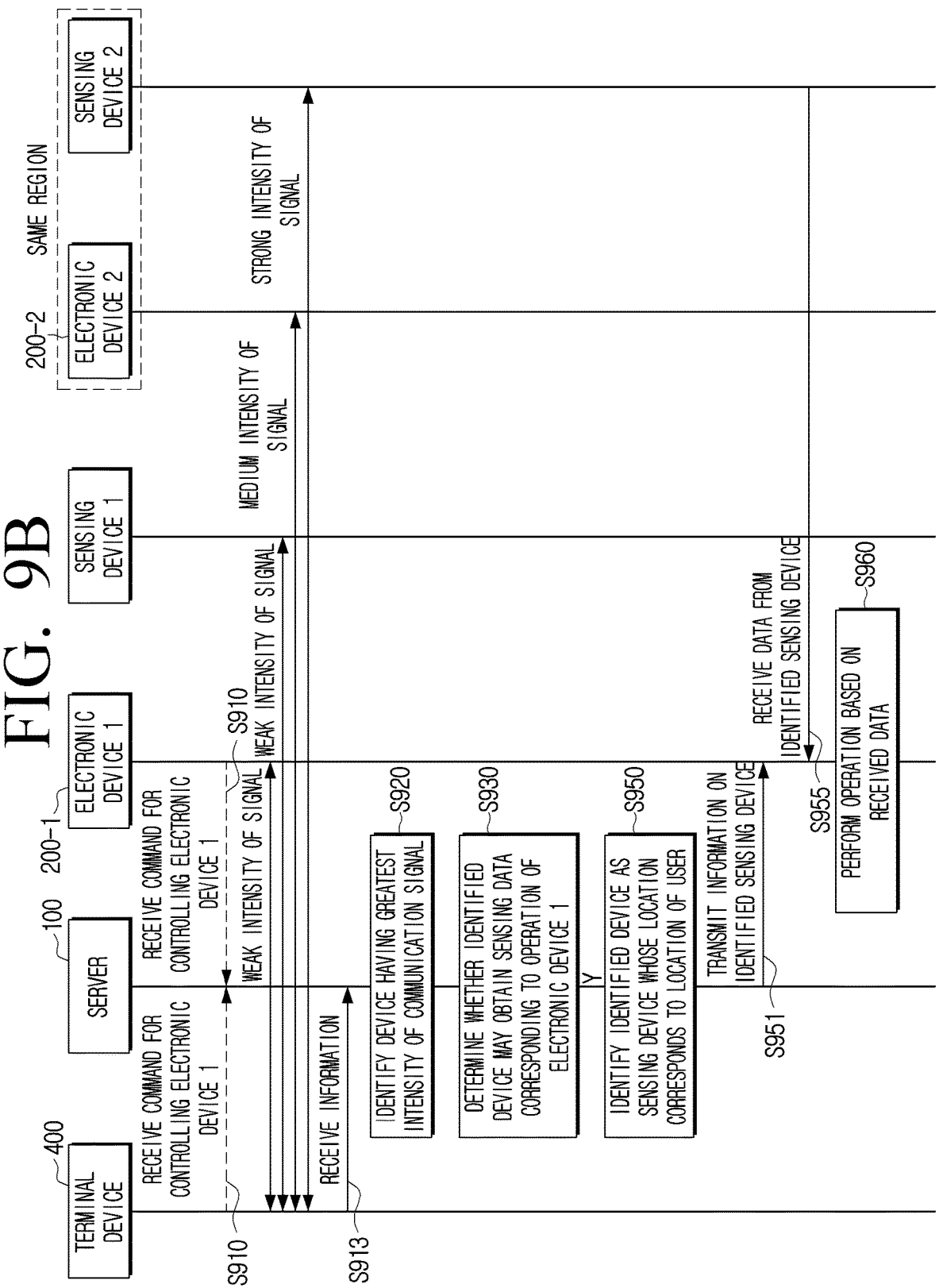

FIG. 10

Device 1 : $Y_1 = W_1 * X_{11} + W_2 * X_{12} + W_3 * X_{13} + \ldots + W_m * X_{1m}$ Device 2 : $Y_2 = W_1 * X_{21} + W_2 * X_{22} + W_3 * X_{23} + \ldots + W_m * X_{2m}$ Device N : $Y_N = W_1 * X_{N1} + W_2 * X_{N2} + W_3 * X_{N3} + \ldots + W_m * X_{Nm}$ $Y_N$ : score $W_m$ : m-th weight $X_{Nm}$ : m-th factor

SERVER AND CONTROL METHOD FOR DETERMINING A TARGET ELECTRONIC DEVICE

CROSS-REFERENCE TO RELATED APPLICATION(S)

This application is a continuation application, claiming priority under § 365(c), of an International application No. PCT/KR2021/004354, filed on Apr. 7, 2021, which is based on and claims the benefit of a Korean patent application number 10-2020-0063921, filed on May 27, 2020, in the Korean Intellectual Property Office, the disclosure of which is incorporated by reference herein in its entirety.

BACKGROUND

1. Field

The disclosure relates to a server and a control method therefor. More particularly, the disclosure relates to a server that controls an operation of an electronic device, and a control method therefor.

2. Description of Related Art

An electronic device of the related art, such as an air conditioner or an air purifier may provide a user with a specific service, such as a heating or cooling service by performing an operation using data on an environment, such as a temperature or a concentration of fine dust, obtained through a built-in sensor.

Meanwhile, the environment of the user and an environment of the electronic device may be different from each other in case that the user is located in a place (or space) different from a location of the electronic device. In this case, the data on the environment, obtained by the built-in sensor of the electronic device, may be obtained based on the location of the electronic device, and thus have a difference (or error) occurring between the data obtained based on the location of the user.

Here, the electronic device may be operated based on the data different from the data on the environment in which the user is located, and the user may have lower satisfaction with the service provided by the electronic device. In addition, the electronic device may only provide the data on the environment in which the electronic device is located, and is unable to provide the data on the environment in which the user is located, which may cause inconvenience to the user.

The above information is provided as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server that controls an operation of a target electronic device by using sensing data of a sensing device located in an environment closer to an environment of a user, and a control method therefor.

Additional aspects will be set forth in part in the description which follows and, in part, will be apparent from the description, or may be learned by practice of the presented embodiments.

In accordance with an aspect of the disclosure, a server is provided. The server includes a communication interface for performing communication with a plurality of electronic devices and a plurality of sensing devices, and at least one processor configured to identify a sensing device corresponding to a location of a user among the plurality of sensing devices based on information received from at least one of the plurality of electronic devices and the plurality of sensing devices through the communication interface, and control the communication interface to transmit a signal for controlling a target electronic device among the plurality of electronic devices to the target electronic device based on sensing data received from the identified sensing device.

Meanwhile, each of the plurality of sensing devices generates the sensing data by sensing a surrounding environment of each sensing device, and the at least one processor may control the communication interface to receive the sensing data generated by sensing the surrounding environment by the identified sensing device from the identified sensing device, and transmit the signal for controlling a surrounding environment of the target electronic device to the target electronic device based on the received sensing data.

Meanwhile, the at least one processor identifies the sensing device corresponding to the location of the user among the plurality of sensing devices as a sensing device closest to the user based on the information received from at least one of the plurality of electronic devices and the plurality of sensing devices.

Meanwhile, the server further includes a memory for storing information on locations of regions in which the plurality of electronic devices and the plurality of sensing devices are located at a specific place, wherein the at least one processor identifies one of the plurality of electronic devices based on the information received from at least one of the plurality of electronic devices through the communication interface, and identifies a sensing device located in the same region as that of the identified electronic device among the plurality of sensing devices as the sensing device corresponding to the location of the user based on the location information.

Meanwhile, the at least one processor identifies the sensing device located in the same region as that of an electronic device that transmits its state information among the plurality of sensing devices as the sensing device corresponding to the location of the user in case that the state information of the electronic device is received from the electronic device controlled based on a user command among the plurality of electronic devices through the communication interface.

Meanwhile, the at least one processor identifies the sensing device located in the same region as that of an electronic device that transmits information on a user voice among the plurality of sensing devices as the sensing device corresponding to the location of the user in case that the information on the user voice is received from the electronic device that receives the user voice among the plurality of electronic devices through the communication interface.

Meanwhile, the at least one processor identifies a device having the greatest intensity of a communication signal, and identify a sensing device corresponding to the identified device among the plurality of sensing devices as the sensing device corresponding to the location of the user based on received information on intensity of the communication signal, in case that the information on the intensities of the communication signals between the plurality of electronic devices, the plurality of sensing devices and a user terminal device is received through the communication interface.

Meanwhile, the at least one processor identifies the sensing device located in the same region as that of the identified electronic device among the plurality of sensing devices as the sensing device corresponding to the location of the user based on the location information in case that one of the plurality of electronic devices is identified as the device having the greatest intensity of the communication signal, and identify the identified sensing device as the sensing device corresponding to the location of the user in case that one of the plurality of sensing devices is identified as the device having the greatest intensity of the communication signal.

Meanwhile, the at least one processor identifies the sensing device corresponding to the location of the user among the plurality of sensing devices based on information on intensities of communication signals received from the plurality of electronic devices and the plurality of sensing devices, and state information of an electronic device or information on a user voice, received from at least one of the plurality of electronic devices, through the communication interface.

Meanwhile, the at least one processor calculates a score by applying a predetermined weight to each value corresponding to the information on the intensity of the communication signal, the state information of the electronic device or the information on the user voice, to each of the plurality of electronic devices and the plurality of sensing devices, identify a device having the highest score among the plurality of electronic devices and the plurality of sensing devices, identify the sensing device located in the same region as that of an identified electronic device among the plurality of sensing devices as the sensing device corresponding to the location of the user based on the location information in case that one of the plurality of electronic devices is identified as the device having the highest score, and identify an identified sensing device as the sensing device corresponding to the location of the user in case that one of the plurality of sensing devices is identified as the device having the highest score.

In accordance with another aspect of the disclosure, a control method for a server is provided. The control method includes identifying a sensing device corresponding to a location of a user among the plurality of sensing devices based on information received from at least one of a plurality of electronic devices and the plurality of sensing devices, and transmitting a signal for controlling a target electronic device among the plurality of electronic devices to the target electronic device based on sensing data received from the identified sensing device.

Meanwhile, each of the plurality of sensing devices generates the sensing data by sensing a surrounding environment of each sensing device, and the transmitting includes receiving the sensing data generated by sensing the surrounding environment by the identified sensing device from the identified sensing device, and transmitting the signal for controlling a surrounding environment of the target electronic device to the target electronic device based on the received sensing data.

Meanwhile, in the identifying of the sensing device, the sensing device corresponding to the location of the user among the plurality of sensing devices may be identified as a sensing device closest to the user based on the information received from at least one of the plurality of electronic devices and the plurality of sensing devices.

Meanwhile, wherein the server stores information on locations of regions in which the plurality of electronic devices and the plurality of sensing devices are located at a specific place, and the identifying of the sensing device includes identifying one of the plurality of electronic devices based on the information received from at least one of the plurality of electronic devices, and identifying a sensing device located in the same region as that of the identified electronic device among the plurality of sensing devices as the sensing device corresponding to the location of the user based on the location information.

Meanwhile, the identifying of the sensing device includes identifying the sensing device located in the same region as that of an electronic device that transmits its state information among the plurality of sensing devices as the sensing device corresponding to the location of the user in case that the state information of the electronic device is received from the electronic device controlled based on a user command among the plurality of electronic devices.

Meanwhile, the identifying of the sensing device includes identifying the sensing device located in the same region as that of an electronic device that transmits information on a user voice among the plurality of sensing devices as the sensing device corresponding to the location of the user in case that the information on the user voice is received from the electronic device that receives the user voice among the plurality of electronic devices.

Meanwhile, the identifying of the sensing device includes identifying a device having the greatest intensity of a communication signal based on received information on intensity of the communication signal, and identifying a sensing device corresponding to the identified device among the plurality of sensing devices as the sensing device corresponding to the location of the user, in case that the information on the intensities of the communication signals between the plurality of electronic devices, the plurality of sensing devices and the user terminal device is received through the communication interface.

Meanwhile, the identifying of the sensing device includes identifying the sensing device located in the same region as that of an identified electronic device among the plurality of sensing devices as the sensing device corresponding to the location of the user based on the location information in case that one of the plurality of electronic devices is identified as the device having the greatest intensity of the communication signal, and identifying an identified sensing device as the sensing device corresponding to the location of the user in case that one of the plurality of sensing devices is identified as the device having the greatest intensity of the communication signal.

Meanwhile, the identifying of the sensing device according to another embodiment of the disclosure includes identifying the sensing device corresponding to the location of the user among the plurality of sensing devices based on information on intensities of communication signals received from the plurality of electronic devices and the plurality of sensing devices, and state information of an electronic device or information on a user voice, received from at least one of the plurality of electronic devices.

Meanwhile, the identifying of the sensing device includes calculating a score by applying a predetermined weight to each value corresponding to the information on the intensity of the communication signal, the state information of the electronic device or the information on the user voice, to each of the plurality of electronic devices and the plurality of sensing devices, identifying a device having the highest score among the plurality of electronic devices and the plurality of sensing devices, identifying the sensing device located in the same region as that of an identified electronic device among the plurality of sensing devices as the sensing device corresponding to the location of the user based on the location information in case that one of the plurality of electronic devices is identified as the device having the highest score, and identifying an identified sensing device as the sensing device corresponding to the location of the user in case that one of the plurality of sensing devices is identified as the device having the highest score.

According to the various embodiments of the disclosure as described above, it is possible to provide the server that controls the operation of the target electronic device by using the sensing data of the sensing device located in the environment closer to the environment of the user, and the control method therefor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates information on a device stored in a server according to an embodiment of the disclosure;

FIG. 8A illustrates a method for determining a sensing device which is a basis of an operation of a target electronic device, by using an electronic device to which a user command is input according to an embodiment of the disclosure;

FIG. 8B illustrates a method for determining a sensing device which is a basis of an operation of a target electronic device by using a sensing device to which a user command is input according to an embodiment of the disclosure;

FIG. 9B illustrates a method for determining a sensing device which is a basis for an operation of a target electronic device, by using an intensity of a signal according to an embodiment of the disclosure;

FIG. 10 illustrates a method for determining a sensing device which is a basis of an operation of a target electronic device, by using a score according to an embodiment of the disclosure;

Throughout the drawings, it should be noted that like reference numbers are used to depict the same or similar elements, features, and structures.

DETAILED DESCRIPTION

Figure 1A:
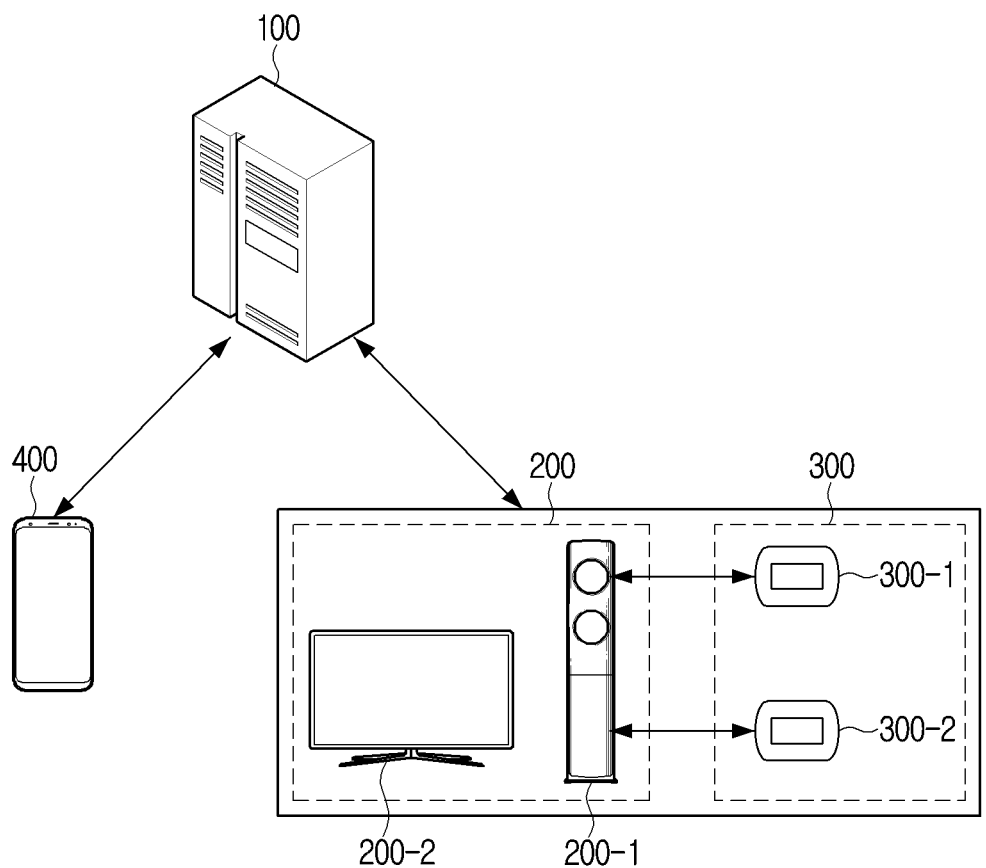
FIG. 1A illustrates a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure provides a server that controls an operation of a target electronic device by using sensing data of a sensing device located in an environment closer to an environment of a user, and a control method therefor.

In describing the disclosure, if it is decided that a detailed description for the known functions or configurations related to the disclosure may unnecessarily obscure the gist of the disclosure, the detailed description thereof is omitted. In addition, the following embodiments may be modified in several different forms, and the scope and spirit of the disclosure are not limited to the following embodiments.

Rather, these embodiments are provided to make the disclosure thorough and complete, and to completely transfer the spirit of the disclosure to those skilled in the art.

It is to be understood that technologies mentioned in the disclosure are not limited to specific embodiments of the disclosure, and include all modifications, equivalents and/or alternatives according to the embodiments of the-disclosure. Throughout the accompanying drawings, similar components are denoted by similar reference numerals.

Expressions "first," "second" and the like, used in the disclosure may indicate various components regardless of a sequence and/or importance of the components. These expressions are only used in order to distinguish one component from the other components, and do not limit the corresponding components.

In the disclosure, an expression "A or B," "least one of A and/or B," "one or more of A and/or B" or the like, may include all possible combinations of items enumerated together. For example, "A or B," "at least one of A and B" or "at least one of A or B" may indicate all of 1) a case where at least one A is included, 2) a case where at least one B is included or 3) a case where both of at least one A and at least one B are included.

A term of a singular form may include its plural forms unless the context clearly indicates otherwise. It is to be understood that a term "include," "formed of" or the like used in the application specifies the presence of features, numerals, steps, operations, components, parts or combinations thereof, which is mentioned in the specification, and does not preclude the presence or addition of one or more other features, numerals, steps, operations, components, parts or combinations thereof.

In case that any component (for example, a first component) is mentioned to be "(operatively or communicatively) coupled with/to" or "connected to "another component (for example, a second component), it is to be understood that any component is directly coupled to another component or may be coupled to another component through still another component (for example, a third component). On the other hand, in case that any component (for example, the first component) is mentioned to be "directly coupled to" or "directly connected to" another component (for example, the second component), it is to be understood that still other component (for example, the third component) is not present between any component and another component.

An expression "configured (or set) to" used in the disclosure may be replaced by an expression "suitable for," "having the capacity to," "designed to," "adapted to," "made to" or "capable of," based on a situation. The expression "configured (or set) to" may not necessarily indicate "specifically designed to" in hardware. Instead, an expression "a device configured to" may indicate that the device may "perform~" together with other devices or components. For example, "a processor configured (or set) to perform A, B, and C" may indicate a dedicated processor (for example, an embedded processor) for performing corresponding operations or a generic-purpose processor (for example, a central processing unit (CPU) or an application processor) which may perform the corresponding operations by executing one or more software programs stored in a memory device.

An electronic device according to various embodiments of the disclosure may include at least one of, for example, a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. According to the various embodiments of the disclosure, the wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), or a living body implantation type wearable device (for example, an implantable circuit).

In addition, in the embodiments of the disclosure, the electronic device may be a home appliance. The home appliance may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a TV box (for example, HomeSync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

In other embodiments of the disclosure, the electronic device may include at least one of various medical devices (for example, various portable medical measuring devices (such as a blood glucose meter, a heart rate meter, a blood pressure meter, or a body temperature meter), a magnetic resonance angiography (MRA), a magnetic resonance imaging (MRI), a computed tomography (CT), a photographing device, or an ultrasonic device), a navigation device, a global navigation satellite system (GNSS), an event data recorder (EDR), a flight data recorder (FDR), an automobile infotainment device, a marine electronic equipment (for example, a marine navigation device, or a gyro compass), avionics, a security device, an automobile head unit, an industrial or household robot, an automatic teller's machine (ATM) of a financial institute, a point of sales (POS) in a store, or internet of things (IoT) devices (for example, a light bulb, various sensors, an electric or gas meter, a sprinkler system, a fire alarm, a thermostat, a street light, a toaster, an exercise equipment, a hot water tank, a heater, or a boiler).

According to still other embodiments of the disclosure, the electronic device may include at least one of a portion of a furniture or building/structure, an electronic board, an electronic signature receiving device, a projector, or various meters (for example, a water meter, an electricity meter, a gas meter, or an electric wave meter). In the various embodiments of the disclosure, the electronic device may be one or a combination of one or more of the various devices described above. The electronic device according to some embodiments may be a flexible electronic device. In addition, the electronic device according to the embodiments of the disclosure is not limited to the above-described devices, and may include a new electronic device according to technological development.

FIG. 1A illustrates a system according to an embodiment of the disclosure.

Figure 1B:
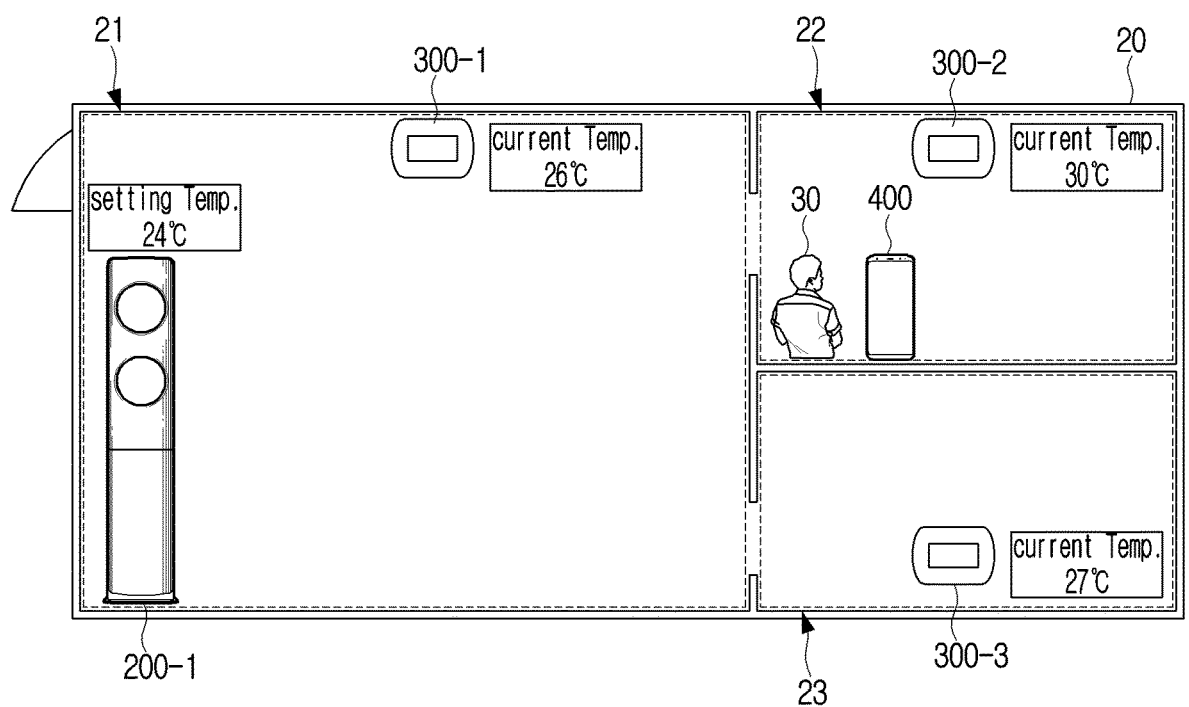
FIG. 1B illustrates a state where a plurality of sensing devices are arranged according to an embodiment of the disclosure.

FIG. 1B illustrates a state where a plurality of sensing devices are arranged according to an embodiment of the disclosure.

Referring to FIGS. 1A and 1B, a system 10 according to an embodiment of the disclosure may include a server 100, a plurality of electronic devices 200, a plurality of sensing devices 300 and a user terminal device 400.

The server 100 may be connected to an external device, such as the plurality of electronic devices 200, the plurality of sensing devices 300, and the user terminal device 400 through a network. For example, the server 100 may be connected to an external device through a network of a user individual unit (e.g., personal area network (PAN)), a network of a local area unit (e.g., home networking or local area network (LAN)) or a network of a wide area unit (e.g., wide area network (WAN) or internet). Accordingly, the server 100 may communicate with the plurality of electronic devices 200, the plurality of sensing devices 300, and the user terminal device 400 to transmit and receive various data (or messages).

Here, the server 100 may refer to a device having authority to manage or control the external device (e.g., at least one device among the plurality of electronic devices 200 and the plurality of sensing devices 300) connected through the network.

To this end, the server 100 may be implemented as an independent server device (e.g., cloud server or home server) distinguished from the plurality of electronic devices 200 and the user terminal device 400. However, this implementation is only an embodiment of the disclosure, and the server 100 may be implemented as one device among the plurality of electronic devices 200 and the user terminal device 400. For example, the server 100 may be implemented as any of various electronic devices, such as an air conditioner, a computer, a smart phone, a television (TV) or an access point (AP). Hereinafter, for convenience of description, the description is provided under assumption that the server 100 is the independent device distinguished from the plurality of electronic devices 200 and the user terminal device 400.

Each of the plurality of electronic devices 200 may be implemented as any of various electronic devices which may communicate with the server 100. For example, each of the plurality of electronic devices 200 may be controlled to perform or stop an operation for providing a service based on a signal received from the server 100. To this end, the electronic device may be implemented as a robot, a computer, a smart TV, a smart speaker, an air conditioner, a digital video disk (DVD) player, an audio player, a robot cleaner, a vacuum cleaner, an oven, a microwave oven, a set-top box, a home automation control panel, a security control panel, a game console (e.g., Xbox, PlayStation), a medical device, a vehicle, an electronic dictionary, a camcorder, a digital photo frame, a point of sales (POS) in a store, various internet of things (IoT) devices (e.g., light bulb, lighting, electricity or gas meter, sprinkler device or fire alarm).

Here, the plurality of electronic devices 200 may include a first electronic device 200-1 (or electronic device 1) and a second electronic device 200-2. In this case, the plurality of electronic devices 200 may be configured in various numbers.

Meanwhile, one electronic device among the plurality of electronic devices 200 may perform the operation for providing a service by using the sensing data. More particularly, one electronic device among the plurality of electronic devices 200 may perform the operation for providing a service by using the sensing data obtained from one sensing device among the plurality of sensing devices 300 based on the signal received from the server 100. Hereinafter, one electronic device operated in this way is referred to as a target electronic device.

Each of the plurality of sensing devices 300 may obtain the sensing data. In this case, the sensing data may be data sensed by an indoor environment or a surrounding environment in which the sensing device is located. In addition, the sensing data may be used by one electronic device (e.g., target electronic device) among the plurality of electronic devices 200 to perform the operation for providing a service.

To this end, the sensing device may be an electronic device including a sensor. For example, the sensing device may be implemented as a sensor itself or the electronic device including a sensor (e.g., TV, robot cleaner, artificial intelligence speaker, a remote control to control the TV, lighting, electricity or gas meter, sprinkler device, fire alarm, thermostat or internet of things (Iot) device). Hereinafter, to assist in understanding of the disclosure, it is assumed that the sensing device is implemented as the sensor itself.

For example, the sensor may be a sensor of various types, such as a temperature sensor, a fine dust sensor, a humidity sensor or a gas sensor. The temperature sensor may obtain sensing data for a temperature (unit: C, ° F., or the like). The fine dust sensor may obtain sensing data for a concentration of fine dust (unit: parts per million (ppm), $\mu g/m^3$, or the like). Here, the fine dust (or particulate matter (PM)) may refer to particles floating in air, and a type of fine dust may include PM 1 with a size (or diameter) of 1 μm or less, PM 2.5 with a size of 2.5 μm or less, PM 10 with a size of 10 μm or less, or the like. The humidity sensor may obtain sensing data for a degree (unit: %, $g/m^3$, or the like) of moisture contained in air. The gas sensor may obtain sensing data for concentration (unit: ppm, or the like) of carbon dioxide or the concentration (unit: Bq/m, or the like) of radon, or the like. Meanwhile, the sensor and the sensing data obtained by the sensor are not limited to the above-described embodiment of the disclosure, and may be implemented in various forms.

Each of the plurality of sensing devices 300 may communicate with the server 100 and at least one of the plurality of electronic devices 200. The sensing device may transmit the sensing data to one electronic device (e.g., target electronic device) among the plurality of electronic devices 200. For example, the sensing device may directly transmit the sensing data to the target electronic device, or the sensing device may transmit the sensing data to the target electronic device through the server 100.

The user terminal device 400 may access the server 100 and control or manage at least one of the plurality of electronic devices 200 and the plurality of sensing devices 300 through authentication on an account of a user 30.

Here, the user terminal device 400 may be used to estimate a location of the user 30. For example, location of the user terminal device 400 may be estimated as the location of the user 30. To this end, the user terminal device 400 may be implemented as a device carried by the user 30, such as a smart phone or a tablet PC, or worn by the user 30, such as a wearable device (e.g., smart watch or smart glasses). However, the user terminal device 400 is not limited to the above-described embodiment of the disclosure, and the user terminal device 400 may be implemented as various electronic devices. Meanwhile, the user terminal device 400 is only for distinguishing the operations, and may be one electronic device among the plurality of electronic devices 200.

The user terminal device 400 may control at least one electronic device among the plurality of electronic devices 200 based on a user command (e.g., touch input, gesture input, voice input, key input or the like of the user 30). In this case, the user terminal device 400 may control at least one electronic device among the plurality of electronic devices 200 through the server 100. To this end, the user terminal device 400 may display a user interface (UI) for controlling at least one electronic device among the plurality of electronic devices 200 on a display.

In addition, the user terminal device 400 may receive information on an operation performed by one electronic device among the plurality of electronic devices 200 from one electronic device. Here, one electronic device may perform the operation by using sensing data obtained from one sensing device among the plurality of sensing devices 300. In this case, the user terminal device 400 may receive the sensing data through one sensing device, one electronic device or the server 100, and the user terminal device 400 may display the received sensing data on the display.

Meanwhile, each of the plurality of electronic devices 200 and the plurality of sensing devices 300 may be disposed in one of a plurality of regions. Referring to FIG. 1B, for example, the plurality of regions may include first to third regions 21 to 23 which are separated from one another at a specific place. Here, the specific place may be any of various places, such as the home or office of the user 30. Referring to FIG. 1B, the first electronic device 200-1 and a first sensing device 300-1 which are the target electronic devices among the plurality of electronic devices 200 may be disposed in the first region 21, a second sensing device 300-2 may be disposed in a second region 22, and a third sensing device 300-3 may be disposed in the third region 23. Here, the sensing data obtained from the first to third sensing devices 300-1 to 300-3 may depend on an environment (or region) in which the first to third sensing devices 300-1 to 300-3 are located.

For example, the first electronic device 200-1 which is the target electronic device may be implemented as an air conditioner, the first to third sensing devices 300-1 to 300-3 among the plurality of sensing devices 300 may include a temperature sensor that senses a temperature of the surrounding environment, and a temperature of the target electronic device is set to a specific temperature (e.g., 24° C.). In this state, it is assumed that a user command for operating the target electronic device in a cooling mode is input to the target electronic device.

An air conditioner of the related art may perform a cooling or heating operation by using the set temperature (e.g., 24° C.) and a temperature (e.g., 26° C.) sensed by a built-in temperature sensor. In this case, a difference between the set temperature (e.g., 24° C.) and an indoor temperature (e.g., 26° C.) of the first region 21 in which the air conditioner is located may not be large, and the air conditioner may thus be controlled to lower an operation speed of a blowing fan or stop an operation of the blowing fan.

Here, there may be an error (or difference) between the temperature sensed for a surrounding environment of the air conditioner (e.g., 26° C. of the first region 21) between a temperature of the environment in which the user 30 is located (e.g., 30° C. of the second region 22), and the air conditioner may thus provide the user 30 with an air conditioning service without accurately recognizing an environment in which the user 30 actually feels. It is thus possible to cause lower satisfaction of the user 30 with respect to the service or the inconvenience of the user 30.

The server 100 according to an embodiment of the disclosure may identify a sensing device corresponding to the location of the user 30 among the plurality of external sensing devices 300, and use the sensing data obtained from the identified sensing device to control the target electronic device to perform an operation for providing a specific service. Here, the sensing device corresponding to the location of the user 30 may be a sensing device in substantially the same environment as that of the user 30, and for example, the sensing device corresponding to the location of the user 30 may be a sensing device closest to the location of the user 30 or a sensing device located in the same region as that of the user 30 (e.g., second sensing device 300-2 disposed in the second region 22).

According to the various embodiments of the disclosure as described above, it is possible to provide the server that controls an operation of the target electronic device by using the sensing data for the environment closer to the environment of the user 30, and the control method therefor. It is thus possible to improve satisfaction of the user 30 with respect to the service, and also to address the inconvenience of the user 30.

Hereinafter, the various embodiments of the disclosure are described with reference to the accompanying drawings.

Figure 2A:
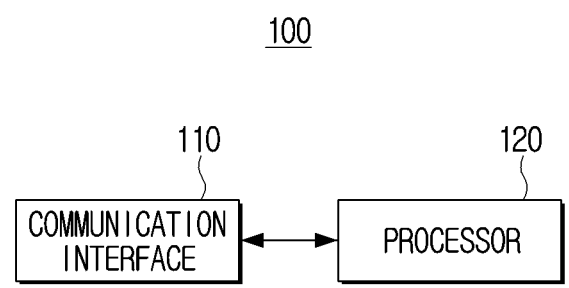
FIG. 2A is a block diagram illustrating a configuration of a server according to an embodiment of the disclosure.

FIG. 2A is a block diagram illustrating a configuration of the server according to an embodiment of the disclosure.

Figure 2B:
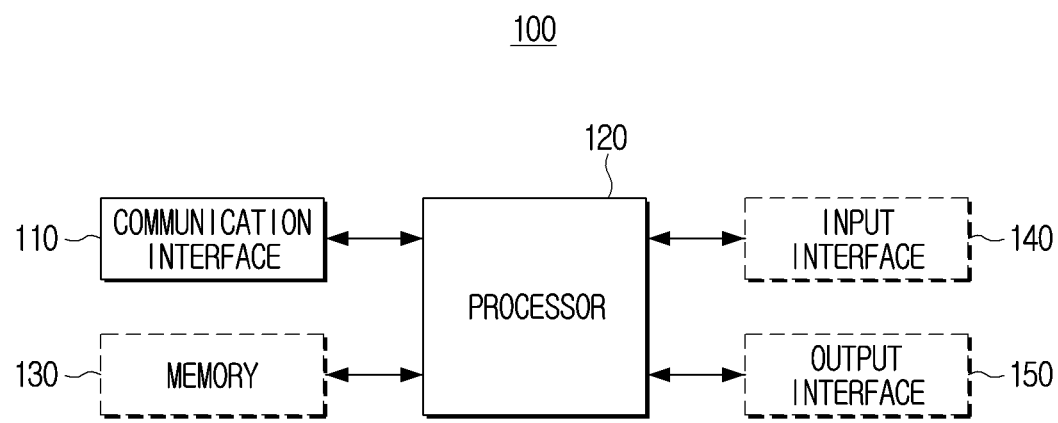
FIG. 2B is a block diagram illustrating an additional configuration of a server according to an embodiment of the disclosure.

FIG. 2B is a block diagram illustrating an additional configuration of the server according to an embodiment of the disclosure.

Referring to FIG. 2A, the server 100 according to an embodiment of the disclosure may include a communication interface 110 and a processor 120.

The communication interface 110 may be connected to the external device and the network through various communication methods. For example, the communication interface 110 may be connected to the external devices, such as the plurality of electronic devices 200, the plurality of sensing devices 300, and the user terminal device 400 through the network to perform communication with these external devices. To this end, the communication interface 110 may be connected to the external device through the network by performing the communication based on various communication methods, such as wireless fidelity (Wi-Fi), Bluetooth, near field communication (NFC), infrared data association (IrDA), radio frequency identification (RFID), ultra-wideband (UWB), Wi-Fi direct, Z-wave, Zigbee, 4LoWPAN, GPRS, Weightless, digital living network alliance (DLNA), ANT+, digital enhanced cordless telecommunications (DECT), wireless local area network (WLAN), global system for mobile communications (GSM), universal mobile telecommunication system (UMTS) and wireless broadband (WiBRO). Accordingly, the communication interface 110 may transmit and receive the various data from the external device.

The processor 120 may control an overall operation of the server 100. The processor 120 may include one or a plurality of processors, and for example, the processor 120 may be implemented as a general-purpose processor, such as a central processing unit (CPU) or an application processor (AP), a graphics-only processor, such as a graphics processing unit (GPU) or a visual processing unit (VPU), or an artificial intelligence (AI)-only processor, such as a neural processing unit (NPU).

The processor 120 may identify the sensing device corresponding to the location of the user 30 among the plurality of sensing devices 300 based on information received from at least one of the plurality of electronic devices 200 and the plurality of sensing devices 300 through the communication interface 110. More particularly, the processor 120 may identify the sensing device corresponding to the location of the user 30 among the plurality of sensing devices 300 as the sensing device closest to the user 30 based on the information received from at least one of the plurality of electronic devices 200 and the plurality of sensing devices 300 through the communication interface 110.

Here, the sensing device corresponding to the location of the user 30 may be the sensing device estimated to be in substantially the same environment as that of the user 30. In addition, each of the plurality of sensing devices 300 may generate the sensing data by sensing the surrounding environment of each sensing device.

Here, the information received from at least one of the plurality of electronic devices 200 and the plurality of sensing devices 300 may include at least one of information on a state of the electronic device, received from at least one of the plurality of electronic devices 200, information on a user voice received from at least one of the plurality of electronic devices 200, or information on intensities of communication signals between the plurality of electronic devices 200, the plurality of sensing devices 300 and the user terminal device 400.

Here, the state information of the electronic device may be information for identifying the electronic device to which the user command is input among the plurality of electronic devices 200 or the electronic device which is controlled based on the input user command. In addition, the state information of the electronic device may include time in case that the user command is input. Here, the user command may refer to user interaction with various types of the electronic devices, such as button input, touch input, and motion input. Here, the electronic device may include an input interface, such as a button or a touch panel for receiving the user command. The information on the user voice may include a signal level (unit: dB, dBm, or the like) of the user voice received from the electronic device which receives the user voice among the plurality of electronic devices 200. Here, the electronic device may include an interface, such as a microphone for receiving the user voice. Information on the intensity of the communication signal may refer to the intensity (or strength) of the signal received from the external device (e.g., electronic device or sensing device) to the user terminal device 400 with respect to the user terminal device 400. Here, the signal may be a signal based on the various communication methods, such as Wi-Fi, Bluetooth, near field communication (NFC), and infrared rays.

Referring to FIG. 2B, according to an embodiment of the disclosure, the server 100 may further include a memory 130, and the memory 130 may store information on locations of the regions in which the plurality of electronic devices 200 and the plurality of sensing devices 300 are located at the specific place. Here, the location information may include spatial coordinates indicating a location of the device or information on a region in which the device is located. However, this configuration is only an embodiment of the disclosure, and the information received from at least one of the plurality of electronic devices 200 and the plurality of sensing devices 300 may include identification information or location information of the device (or at least one of the plurality of electronic devices 200 and the plurality of sensing devices 300) that transmits the information.

For example, the processor 120 may identify one of the plurality of electronic devices 200 based on the information received from at least one of the plurality of electronic devices 200 through the communication interface 110. This identification may be made by using the fact that the location of the electronic device identified by the user command or the user voice may be estimated as the location of the user 30 (or as the location close to the user 30). It is thus possible to protect privacy of the user 30 in that there is no need to directly sense the user 30, and it may be economical in that there is no need to provide a separate physical sensor for sensing the user 30.

For a specific example, the processor 120 may identify an electronic device (or the electronic device to which the user command is input) controlled based on the user command among the plurality of electronic devices 200 based on the received information in case that the information (e.g., state information) from the electronic device controlled based on the user command (e.g., user command pressing a button on a remote control for controlling a TV) among the plurality of electronic devices 200 is received through the communication interface 110.

For another example, the processor 120 may identify an electronic device that receives the user voice having the greatest signal level among the plurality of electronic devices 200 based on the received information in case that the information on the user voice (e.g., signal level of the user voice) is received from the electronic device (e.g., remote control including a microphone) that receives the user voice among the plurality of electronic devices 200 through the communication interface 110.

In this case, the processor 120 may identify the sensing device corresponding to the location of the user 30 among the plurality of sensing devices 300 based on the identified location of the electronic device among the plurality of electronic devices 200. Here, the processor 120 may use the identified location information of the electronic device and the location information of the plurality of sensing devices 300.

For a specific example, the sensing device corresponding to the location of the user 30 may be the sensing device closest to the user 30 among the plurality of sensing devices 300. Here, the sensing device closest to the user 30 may be a sensing device having the smallest distance between a reference electronic device and the sensing device among the plurality of sensing devices 300 based on the electronic device (or user terminal device 400) whose location is estimated as the location of the user 30 among the plurality of electronic devices 200. Here, the reference electronic device may be an electronic device that receives the user command or user voice, or an electronic device having the greatest intensity of a signal with the user terminal device. Here, a distance may be expressed as a difference value between the spatial coordinates representing the locations. For example, the processor 120 may identify the sensing device closest to the reference electronic device among the plurality of sensing devices 300 as the sensing device corresponding to the location of the user 30 based on the location information (e.g., spatial coordinates) in case that one of the plurality of electronic devices 200 is identified as the reference electronic device based on the information received from at least one of the plurality of electronic devices 200 through the communication interface 110.

For another specific example, the sensing device corresponding to the location of the user 30 may be the sensing device located in the same region as that of the user 30 among the plurality of sensing devices 300. For example, the sensing device corresponding to the location of the user 30 may be the sensing device located in the same region as that of the electronic device that receives the user command or user voice among the plurality of sensing devices 300 in case that comparing a region in which the electronic device that receives the user command or user voice is located and regions in which the plurality of sensing devices 300 are located with each other. For example, the processor 120 may identify the sensing device located in the same region as that of the identified electronic device among the plurality of sensing devices 300 as the sensing device corresponding to the location of the user 30 based on the location information (e.g., region in which the device is located) in case that one of the plurality of electronic devices 200 is identified based on the information received from at least one of the plurality of electronic devices 200 through the communication interface 110. This configuration is to obtain the sensing data closer to the environment of the user by identifying the sensing device located in the same region as that of the identified electronic device as the sensing device corresponding to the location of the user based on a case where the sensing device closest to the identified electronic device is located in another region (e.g., another room or another space).

Meanwhile, according to an embodiment of the disclosure, the processor 120 may identify a device having the greatest intensity (or strength) of the communication signal based on the received information on the intensity of the communication signal in case that information on the intensities of the communication signals between the plurality of electronic devices 200, the plurality of sensing devices 300 and the user terminal device 400 is received through the communication interface 110. Here, the user terminal device 400 may be closer to the external device as a level of the communication signal of the external device received from the user terminal device 400 is greater. In addition, it may be determined that a specific external device is closer to the user 30 as the level of the communication signal between the specific external device and the user terminal device 400 is greater by using the fact that the location of the user terminal device 400 may be estimated as the location of the user 30 (or as the location close to the user 30).

Here, the communication signal may be any of various types of wireless signals or optical signals, such as Wi-Fi, Bluetooth, NFC or infrared rays. In addition, the intensity of the communication signal is the level of the communication signal received from the external device based on the user terminal device 400, and may have a unit, such as dBm.

Meanwhile, this configuration is only an embodiment of the disclosure, and the user terminal device 400 may transmit or receive a time of flight (ToF) signal, such as ultrasound having a constant propagation speed with the plurality of electronic devices 200 and the plurality of sensing devices 300. In this case, the processor 120 may perform control to receive transmission time of the ToF signal between the plurality of electronic devices 200 the plurality of sensing devices 300, and the user terminal device 400, and identify a device having the shortest transmission time of the ToF signal among the plurality of electronic devices 200 and the plurality of sensing devices 300 based on the received transmission time. Here, the user terminal device 400 and the external device may be closer to each other as the transmission time of the ToF signal is the shorter between the user terminal device 400 and the external device.

In this case, the processor 120 may identify the sensing device corresponding to the identified device among the plurality of sensing devices 300 as the sensing device corresponding to the location of the user 30.

More particularly, the processor 120 may identify the sensing device located in the same region as that of the identified electronic device among the plurality of sensing devices 300 as the sensing device corresponding to the location of the user 300 based on the location information (e.g., region in which the identified electronic device is located or region in which the plurality of sensing devices 300 are located) in case that one of the plurality of electronic devices 200 is identified as the device having the greatest intensity of the communication signal. Alternatively, the processor 120 may identify the sensing device closest to the identified electronic device among the plurality of sensing devices 300 as the sensing device corresponding to the location of the user 300 based on the location information (e.g., spatial coordinates indicating the identified electronic device or spatial coordinates indicating the locations of the plurality of sensing devices 300) in case that one of the plurality of electronic devices 200 is identified as the device having the greatest intensity of the communication signal. The reason is that the identified electronic device may be determined to be closest to the location of the user 30. In this case, the processor may identify the sensing device closest to the location of the user 30 by using the identified electronic device.

On the other hand, the processor 120 may identify the identified sensing device as the sensing device corresponding to the location of the user 30 in case that one of the plurality of sensing devices 300 is identified as the device having the greatest intensity of the communication signal. The reason is that the identified sensing device may be determined to be closest to the location of the user 30.

The processor 120 may then control the communication interface 110 to transmit a signal for controlling the target electronic device among the plurality of electronic devices 200 to the target electronic device based on the sensing data received from the identified sensing device.

For example, the processor 120 may control the communication interface 110 to receive the sensing data generated by sensing the surrounding environment by the identified sensing device from the identified sensing device, and control the communication interface 110 to transmit the signal for controlling a surrounding environment of the target electronic device to the target electronic device based on the received sensing data. For example, the sensing data of the identified sensing device may be transmitted from the identified sensing device to the target electronic device through the server 100.

For another example, the processor 120 may control the communication interface 110 to transmit, to the identified sensing device, a signal for controlling the identified sensing device so that the sensing data generated by sensing the surrounding environment by the identified sensing device is transmitted to the target electronic device. In this case, the processor 120 may control the communication interface 110 to transmit the signal for controlling the target electronic device to the target electronic device so that the target electronic device performs an operation based on the sensing data received from the identified sensing device. For example, the sensing data of the identified sensing device may be directly transmitted from the identified sensing device to the target electronic device without going through the server 100.

In this case, the target electronic device may perform the operation for providing a service (e.g., heating/cooling operation or air purification operation) based on the signal received from the server 100 and the sensing data of the identified sensing device.

According to the various embodiments of the disclosure as described above, it is possible to provide the server that controls the operation of the target electronic device by using the sensing data for the environment closer to the environment of the user 30, and the control method therefor. It is thus possible to improve the satisfaction of the user 30 with respect to the service, and also to address the inconvenience of the user 30.

According to the various embodiments of the disclosure, it is also possible to sense the environment estimated to be the environment of the user 30 without accurately sensing the location of the user 30. It may thus be economical in that there is no need for a sensor device including separate hardware and software for sensing the location of the user 30, and further, it is also possible to protect the privacy of the user 30.

Referring to FIG. 2B, the server 100 according to an embodiment of the disclosure may include at least one of the memory 130, an input interface 140 and an output interface 150 in addition to the communication interface 110 and the processor 120.

The memory 130 may store instructions or programs executed by the processor 120. In addition, the memory 130 may store information or data received through the communication interface 110. For example, the memory 130 may store information on the account of the user 30, the location information of the plurality of electronic devices 200 and the plurality of sensing devices 300, the sensing data received from the plurality of sensing devices 300, or various requests or user commands received from the user terminal device 400.

The memory 130 may be accessed by the processor 130, and readout, recording, correction, deletion, update, and the like, of instructions, modules, artificial intelligence models or data may be performed under control of the processor 120.

The input interface 140 may receive various user inputs and transmit the same to the processor 120. The input interface may include, for example, at least one of a touch panel (not shown), a pen sensor (not shown), a key (not shown), or a microphone (not shown). The touch panel may use, for example, at least one of a capacitive type, a pressure-sensitive type, an infrared type, or an ultrasonic type, and to this end, the touch panel may include a control circuit. The touch panel may further include a tactile layer to provide the user with a tactile reaction. The pen sensor may be, for example, a part of the touch panel or may include a separate sheet for identification. The key may include, for example, a physical button, an optical key, or a keypad. Such an input interface may be built into the server 100, such as a built-in keyboard, a trackpad, a button or a touch panel, or implemented as a separate external device (not shown), such as an external keyboard or mouse.

The output interface 150 may include at least one of the display (not shown) and a speaker (not shown). Here, the display is a device for outputting the information in a visual form (e.g., text or image). The display may display an image frame in all or part of a display region. The display region may refer to an entire region in units of pixels in which the information or data is visually displayed. At least a part of the display may be coupled to at least one of the front region, a side region or a rear region of the server 100 in the form of a flexible display. The flexible display may be bent, curved, or rolled without being damaged through a thin and flexible substrate like paper. The speaker is a device for outputting the information in an auditory form (e.g., voice). The speaker may directly output various kinds of notification sounds or voice messages as well as various audio data on which various processing operations, such as decoding, amplification, and noise filtering are performed by an audio processing part (not shown).

Hereinafter, the description describes a method of registering a device in the server with reference to FIG. 3 to FIG. 5.

Figure 3:
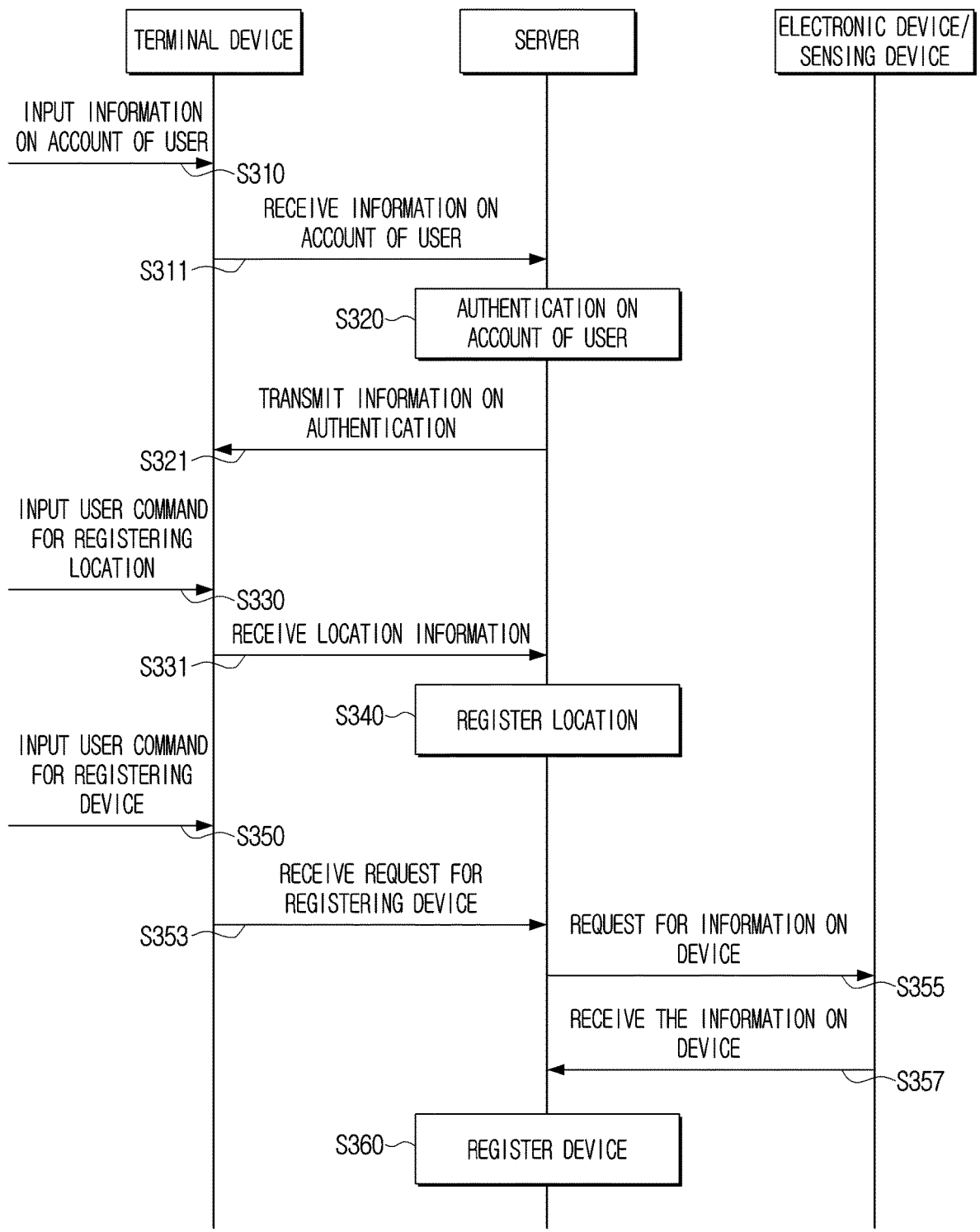
FIG. 3 illustrates a method for registering a device in a server according to an embodiment of the disclosure.

FIG. 3 illustrates a method for registering a device in a server according to an embodiment of the disclosure.

Figure 4:
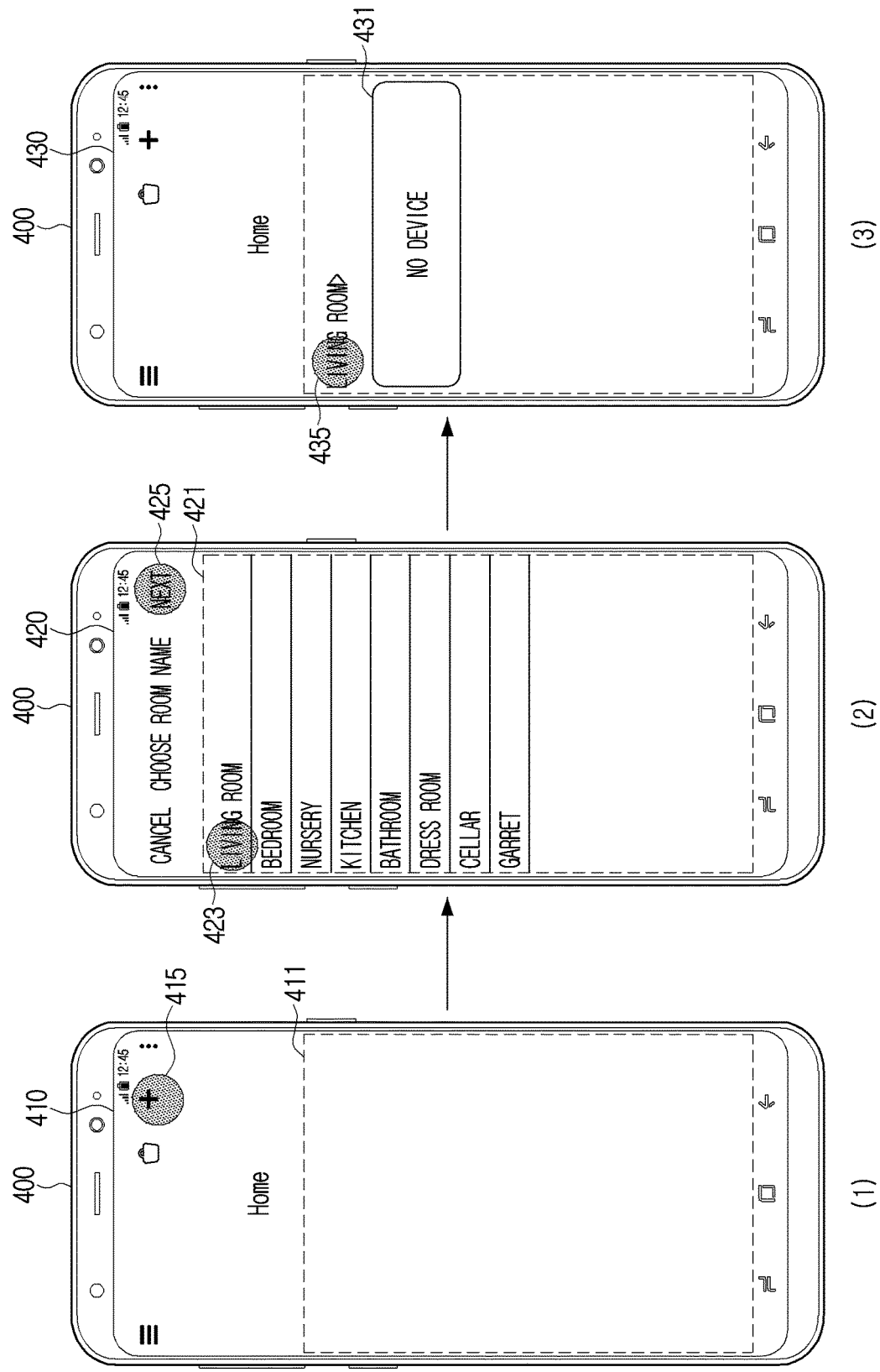
FIG. 4 illustrates a user interface (UI) for registering a location according to an embodiment of the disclosure.

FIG. 4 illustrates a user interface (UI) for registering a location according to an embodiment of the disclosure.

Figure 5:
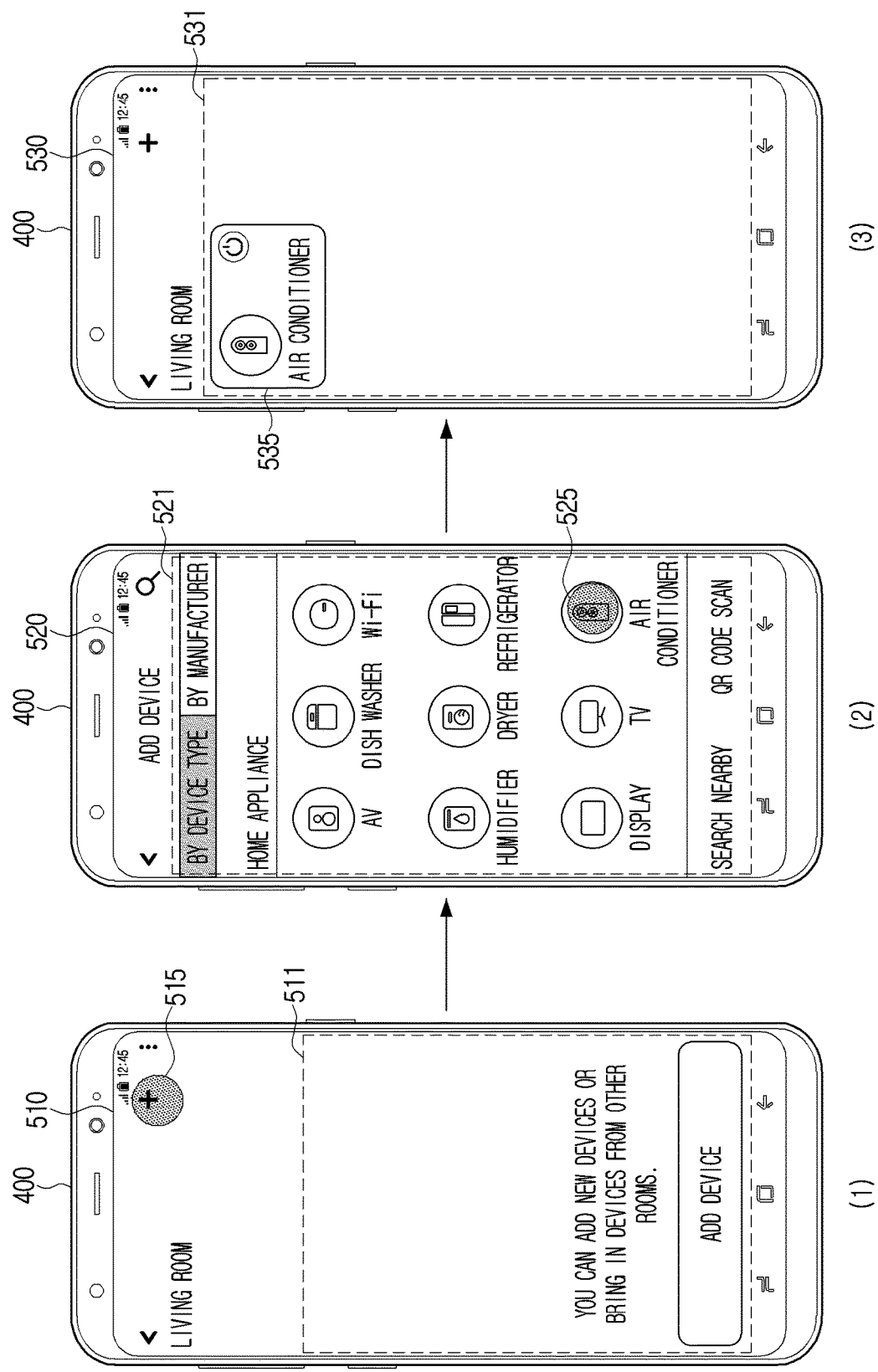
FIG. 5 illustrates a UI for registering a device in a server according to an embodiment of the disclosure.

FIG. 5 illustrates a UI for registering a device in a server according to an embodiment of the disclosure.

FIG. 6 illustrates information on a device stored in a server according to an embodiment of the disclosure.

Referring to FIGS. 3 to 6, a user terminal device 400 may access a server 100 by using a network address, and a user 30 may input information on the account of the user 30 to the server 100 through the user terminal device 400 (at operation S310). In this case, the server 100 may receive the information on the account of the user from the user terminal device 400, and may perform authentication on the account of the user by comparing the received information on the account of the user and pre-stored key information (at operation S320). To this end, the server 100 may store the information on the account of the user 30 input in a previous account registration step as the key information. The information on the account of the user may include a unique identifier (e.g., a user identification (ID)) to distinguish and identify the user 30 from other users, and encrypted information (e.g., password, fingerprint information of the user 30, iris information of the user 30, facial contour information of the user 30, or vein information of the user 30) used to identify the user 30 to restrict other users from viewing the information of the user 30.

The server 100 may then transmit information or a message indicating that the authentication is completed to the user terminal device 400 in case that the user 30 is authenticated (or confirmed) as a result of performing the authentication (at operation S321). In this case, the user terminal device 400 may display the received information or message on a display.

Referring to part (1) of FIG. 4, a first user interface (UI) 410 may be displayed on the display of the user terminal device 400. The first UI 410 may include a first UI element 411 for displaying information on a location (or a place) or a device, registered in the account of the user 30 and a second UI element 415 for registering the location (or device) in the account of the user 30. Here, the first UI 410 may appear as shown in part (1) of FIG. 4 in case that there is no location currently registered and no device currently registered.

After the user 30 is authenticated (or confirmed) as the result of performing the authentication, a user command for registering (or adding) a location in the account of the user 30 may then be input through the user terminal device 400 (at operation S330). Here, the user terminal device 400 may transmit the input user command to the server 100 (at operation S331). The server 100 may here receive the user command for registering the location in the account of the user 30 from the user terminal device 400 (at operation S331), and the location may then be registered in the account of the user 30 based on the received user command and stored in a memory 130 (at operation S340).

For example, the user command (e.g., touch) for selecting the second UI element 415 displayed on the display of the user terminal device 400 may be input through the input interface of the user terminal device 400 as shown in part (1) of FIG. 4. In this case, the user terminal device 400 may display a second UI 420 corresponding to the user command for selecting the second UI element 415 on the display as shown in part (2) of FIG. 4. The second UI 420 may include a list for a plurality of locations (or a plurality of places). However, this configuration is only an embodiment of the disclosure, and it is also possible for the user 30 to input or modify a text indicating the location through the second UI 420. As shown in part (2) of FIG. 4, the user terminal device 400 may select a specific location, such as a living room 423 through the second UI 420, and transmit the information 421 for registering (or adding) the selected location to the account of the user 30 to the server 100 in case that a user command for selecting a third UI element 425 for confirming the selected location is input. The user terminal device 400 may then display a third UI 430 as shown in part (3) of FIG. 4. The third UI 430 may include information 431 on a device in the location registered in the account of the user 30, and may appear as shown in part (3) of FIG. 4 in case that there is no device in the currently registered living room.

After the user 30 is authenticated (or confirmed) as the result of performing the authentication, a user command for registering the external device may then be input through the user terminal device 400 (at operation S350). Here, the user terminal device 400 may transmit the input user command to the server 100 (at operation S353).

For example, the user terminal device 400 may display a fourth UI 510 as shown in part (1) of FIG. 5 on the display in case that a user command in which the user 30 selects a location, such as a living room 435 registered in the account of the user 30 is input to the user terminal device 400 through the third UI 430 of the user terminal device 400. The fourth UI 510 may include information 511 on a device in the registered living room 435 and a UI element 515 for registering (or adding) the device. It is possible to search for an electronic device or a sensing device which may be registered within the network (e.g., Wi-Fi or Bluetooth network environment) of the user terminal device 400 in case that a user command for selecting the UI element 515 for registering (or adding) the device in the user terminal device 400 is input. In this case, the user terminal device 400 may transmit a signal for searching for the electronic device or the sensing device in the network by using various network protocols, and receive identification information of the device from the electronic device or the sensing device in response to this request. The user terminal device 400 may then display a fifth UI 520 as shown in part (2) of FIG. 5 on the display in case of receiving the identification information 521. Here, the fifth UI 520 may include a list of found devices corresponding to the received identification information. The user terminal device 400 may transmit the input user command to the server 100 in case that a user command for selecting a device, such as an air conditioner 525 among the devices found in the user terminal device 400 is input.

The server 100 may receive a user command for registering the selected device in the account of the user 30 from the user terminal device 400 (at operation S353), and the server 100 may then transmit a request for information on the device to the selected device (at operation S355). In response to this request, the selected device may transmit the information on the device to the server 100 (at operation S357). Here, the information on the device may include unique identification information (e.g., name, model, serial number or Mac address) for identifying the selected device and information, such as a type of sensing data which may be obtained.

The server may here receive the information on the device from the selected device (at operation S357), and the server 100 may then register the selected device in the account of the user 30 and store the same in the memory based on the received information on the device (at operation S360). The user terminal device 400 may then display a sixth UI 530 as shown in part (3) of FIG. 5. The sixth UI 530 may include information 531 on a device in the location registered in the account of the user 30, and the sixth UI 530 may appear as shown in part (3) of FIG. 5 in case that the device currently in the living room is an air conditioner 535. The user terminal device 400 may then transmit a user command for controlling an operation of the air conditioner 535 to the air conditioner 535 through the server 100 in case that the user command for controlling the operation of the air conditioner 535 registered through the user terminal device 400 is input. The operation of the air conditioner 535 may be controlled by this method or the like. For example, the server 100 may have the authority to control the registered electronic device or the registered sensing device after the electronic device or the sensing device is registered in the server 100. For example, the server 100 may change the registered electronic device or the registered sensing device to be powered on/off, control the registered electronic device to perform a specific operation or stop the specific operation, or periodically receive the sensing data from the registered sensing device.

As described above, the server 100 may register the external device (e.g., plurality of electronic devices 200 and plurality of sensing devices 300) connected through the network, and the information on the registered external devices may be stored in the server 100 for each user account.

The server 100 may then receive data (or message) from the registered external device, or transmit the data (or user command) to the registered external device. For example, the server 100 may periodically receive the sensing data from the plurality of registered sensing devices 300. For another example, the server 100 may transmit a signal for controlling the registered external device to perform a specific operation to the registered external device. More particularly, the server 100 may transmit a signal for controlling the operation to be performed by using the sensing data received from one sensing device among the plurality of registered sensing devices 300 to one of the plurality of registered electronic devices 200.

Here, the information on the registered external device may include unique identification information (e.g., device ID, quick response (QR) code or barcode) for distinguishing and identifying the external device from other external devices. In addition, the information on the registered external device may include information on a region (or information on a location) in which the external device is located, information on the sensing data which may be obtained by the external device, or the like.

For example, as shown in FIG. 6, the information on the registered external device may include information indicating that a temperature sensor 1 is located in the first region 21 (or room #1), information indicating that sensing data which may be obtained by the temperature sensor 1 is a temperature, or the like. The information on the external device registered in this way may include information indicating that an air conditioner which may obtain an infrared signal as the sensing data is located in the first region 21, information indicating that a temperature sensor 2 that may obtain the temperature as the sensing data and a TV that may obtain the user voice and the infrared signal as the sensing data are located in the second region 22, or the like.

Figure 7:
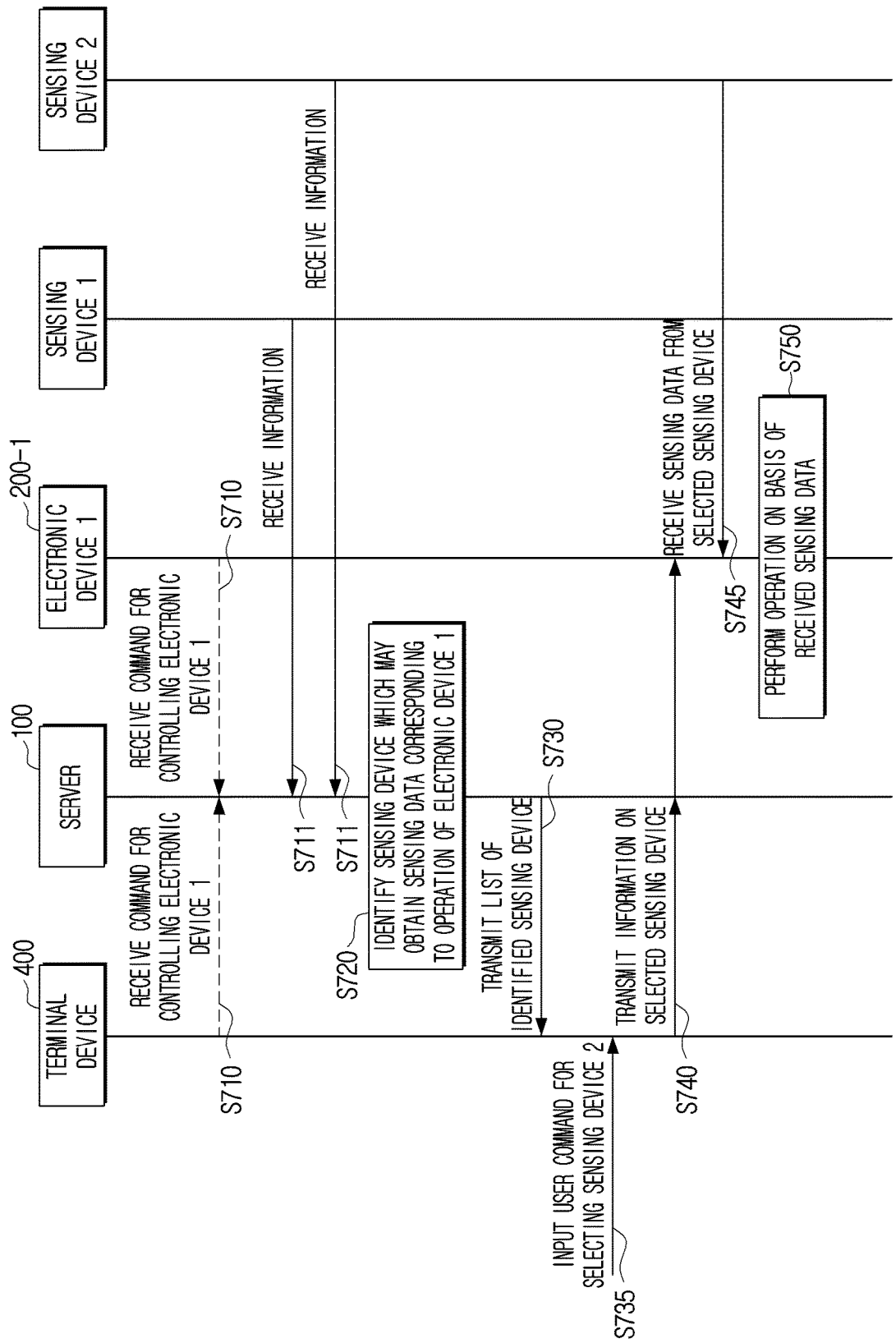
FIG. 7 illustrates a method for determining a sensing device which is a basis of an operation of a target electronic device through a user command according to an embodiment of the disclosure.

FIG. 7 illustrates a method for determining a sensing device which is a basis of an operation of a target electronic device through a user command according to an embodiment of the disclosure.

Here, the description is provided under assumption that an electronic device 1, a sensing device 1, and a sensing device 2 are registered in the account of the user 30 and stored in the server 100, and the sensing device 1 (e.g., temperature sensing device 1) and the sensing device 2 (e.g., temperature sensing device 2) are the sensing devices which may obtain the sensing data used to perform an operation of the electronic device 1 (e.g., air conditioner 1).

Referring to FIG. 7, the processor 120 of the server 100 may control the communication interface 110 to receive a command for controlling the electronic device 1 from the user terminal device 400 or the electronic device 1 (at operation S710). In this case, the processor 120 may control the communication interface 110 to transmit a request for information on the sensing data which may be obtained to the plurality of sensing devices 300. Here, the electronic device 1 is referred to as the target electronic device.

In response to this request, the information may be received from the plurality of sensing devices 300 through the communication interface 110 (at operation S711), and the processor 120 may then identify the sensing device which may obtain sensing data corresponding to the operation of the target electronic device among the plurality of sensing devices 300 based on the received information (at operation S720). For example, the processor 120 may identify the sensing device 1 and the sensing device 2 which may each obtain the sensing data for a temperature used to perform an operation of the air conditioner 1 among the plurality of sensing devices 300. Here, the received information may include the identification information of the sensing device and the information on the sensing data which may be obtained by the sensing device. However, this configuration is only an example, and the identification information of the sensing device and the information on the sensing data which may be obtained by the sensing device may be pre-stored in the server 100. In this case, operation S711 related to an operation of receiving the information from the sensing device may be omitted.

The processor 120 may control the communication interface 110 to transmit a list of the identified sensing devices (e.g., sensing device 1 and sensing device 2) to the user terminal device 400 (at operation S730).

In this case, the user terminal device 400 may display the list received from the server 100 on the display, and transmit information on the selected sensing device 2 to the server 100 (at operation S740) in case of receiving a user command for selecting the sensing device 2 in the list. The server 100 may control the target electronic device to perform an operation based on the received information on the sensing device 2. For example, the processor 120 may control the communication interface 110 to transmit a signal for controlling the target electronic device to receive the sensing data from the selected sensing device 2 to the target electronic device or the sensing device 2. The target electronic device or the sensing device 2 may transmit the data obtained from the sensing device 2 to the target electronic device based on the received signal (at operation S745). However, this configuration is only an example, and it is also possible for the server 100 to receive the data obtained from the sensing device 2 and transmit the same to the target electronic device. The target electronic device may then perform the operation based on the received sensing data (at operation S750).

FIG. 8A illustrates a method for determining a sensing device which is a basis of an operation of a target electronic device, by using an electronic device to which a user command is input according to an embodiment of the disclosure.

FIG. 8B illustrates a method for determining a sensing device which is a basis of the operation of the target electronic device by using a sensing device to which a user command is input according to an embodiment of the disclosure.

Here, FIG. 8A shows a case where the device to which a user command is input is the electronic device, and FIG. 8B shows a case where the device to which a user command is input is the sensing device.

Hereinafter, it is assumed that the electronic device 1 and the electronic device 2 are registered as a plurality of electronic devices 200, the sensing device 1 and the sensing device 2 are registered as the plurality of sensing devices 300, and the electronic device 2 is registered as being located in the same region as that of the sensing device 2, in the account of the user 30, to be stored in the server 100. In addition, the description is provided under assumption that the sensing device 1 (e.g., temperature sensing device 1) and the sensing device 2 (e.g., temperature sensing device 2) are the sensing devices that may obtain the sensing data used to perform the operation of the electronic device 1 (e.g., air conditioner 1).

Referring to FIG. 8A and FIG. 8B, the processor 120 of the server 100 may control the communication interface 110 to receive a command for controlling the electronic device 1 from the user terminal device 400 or the electronic device 1 (at operation S810). Here, the electronic device 1 is referred to as the target electronic device.

Referring to FIG. 8A, the user command or user voice may be input to the electronic device 2 (e.g., TV or remote control interlocked with the TV) among the plurality of electronic devices 200 and the plurality of sensing devices 300 (at operation S811). Time when the user command or user voice is input to the electronic device 2 may be the same time before or after operation S810. In this case, the electronic device 2 may transmit information on a state of the controlled electronic device or information on the user voice to the server 100 based on the user command (at operation S813).

The processor 120 may control the communication interface 110 to receive the information on the user voice from the electronic device that receives the state information of the electronic device or the user voice from the electronic device controlled based on the user command among the plurality of electronic devices 200 (at operation S813).

In this case, the processor 120 may identify the sensing device located in the same region as that of an electronic device that transmits its state information among the plurality of sensing devices 300 as the sensing device corresponding to the location of the user 30. Meanwhile, the processor 120 may identify the sensing device located in the same region as that of an electronic device that transmits the information on the user voice among the plurality of sensing devices 300 as the sensing device corresponding to the location of the user 30.

More particularly, the processor 120 may identify a device that receives the user command or user voice among the plurality of electronic devices 200 and the plurality of sensing devices 300 based on the state information of the electronic device or the information on the user voice (at operation S820). In this case, the processor 120 may identify a device to which a latest user command is input by comparing the time when the user commands included in the state information of the electronic device are input with each other. For another example, the processor 120 may identify the device that receives the user voice having the greatest signal level by comparing the signal levels of the user voices included in the information on the user voices of the electronic device with each other. For example, in a case of FIG. 8A, the electronic device 2 to which the user command is input may be identified.

The processor 120 may then determine whether the identified device is able to obtain sensing data used for the operation of the target electronic device by comparing the information on the sensing data which may be obtained by the identified device and information on sensing data requested by the target electronic device with each other (at operation S830). The information on the sensing data which may be obtained by the identified device and the information on the sensing data requested by the target electronic device may be the information pre-stored in the server 100 or the information received from each device. For example, in the case of FIG. 8A, the processor may determine that the identified electronic device 2 is unable to obtain the sensing data corresponding to the operation of the target electronic device.

The processor may determine that the identified electronic device is unable to obtain the sensing data corresponding to the operation of the target electronic device (N in operation S830). In this case, the processor 120 may then identify the sensing device located in the same region as that of the identified device among the plurality of sensing devices 300 as the sensing device corresponding to the location of the user by comparing location information of the identified device and location information of the target electronic device (at operation S840). The location information of the identified device and the location information of the target electronic device may be the information pre-stored in the server 100 or the information received from each device. For example, in the case of FIG. 8A, the processor may identify the sensing device 2 located in the same region as that of the identified electronic device 2 as the sensing device corresponding to the location of the user.

The processor 120 may allow a signal for controlling an operation to be performed based on the sensing data obtained from the identified sensing device 2 to be transmitted to the target electronic device (at operation S841). In this case, the target electronic device may receive information on the identified sensing device (e.g., identification information or network information), and receive the sensing data from the sensing device 2 based on the information on the identified sensing device (at operation S845). However, this configuration is only an example, and it is also possible for the server 100 to receive the sensing data from the sensing device 2 and transmit the same to the target electronic device. The target electronic device may then perform the operation based on the received sensing data (at operation S860).

Meanwhile, referring to FIG. 8B, the user command or user voice may be input to the sensing device 2 among the plurality of electronic devices 200 and the plurality of sensing devices 300 (at operation S812). In this case, the sensing device 2 may include a temperature sensor and may further include at least one of an input interface and a microphone. Time when the user command or user voice is input to the sensing device 2 may be the same time before or after operation S810. In this case, the sensing device 2 may transmit the state information of the controlled electronic device or the information on the user voice to the server 100 based on the user command (at operation S814).

The processor 120 may identify a device that receives the user command or user voice among the plurality of electronic devices 200 and the plurality of sensing devices 300 based on the received state information of the electronic device or the information on the user voice (at operation S820). The processor 120 may then determine whether the identified device is able to obtain the sensing data used for the operation of the target electronic device by comparing the information on the sensing data which may be obtained by the identified device and the sensing data requested by the target electronic device with each other (at operation S830). For example, in a case of FIG. 8B, the processor may identify the sensing device 2, and determine that the sensing data used for the operation of the target electronic device may be obtained.

Here, the processor may determine that the identified electronic device is able to obtain the sensing data corresponding to the operation of the target electronic device (Y in operation S830). In this case, the processor 120 may identify the identified device as the sensing device corresponding to the location of the user (at operation S850). For example, in the case of FIG. 8B, the processor may identify the sensing device 2 as the sensing device corresponding to the location of the user.

The processor 120 may then allow a signal for controlling the operation to be performed based on the sensing data obtained from the identified sensing device 2 to be transmitted to the target electronic device (at operation S851). In this case, the target electronic device may receive the information on the identified sensing device (e.g., identification information or network information), and receive the sensing data from the sensing device 2 through the information on the identified sensing device (at operation S855). However, this configuration is only an example, and it is also possible for the server 100 to receive the sensing data from the sensing device 2 and transmit the same to the target electronic device. The target electronic device may then perform the operation based on the received sensing data (at operation S860).

Figure 8C:
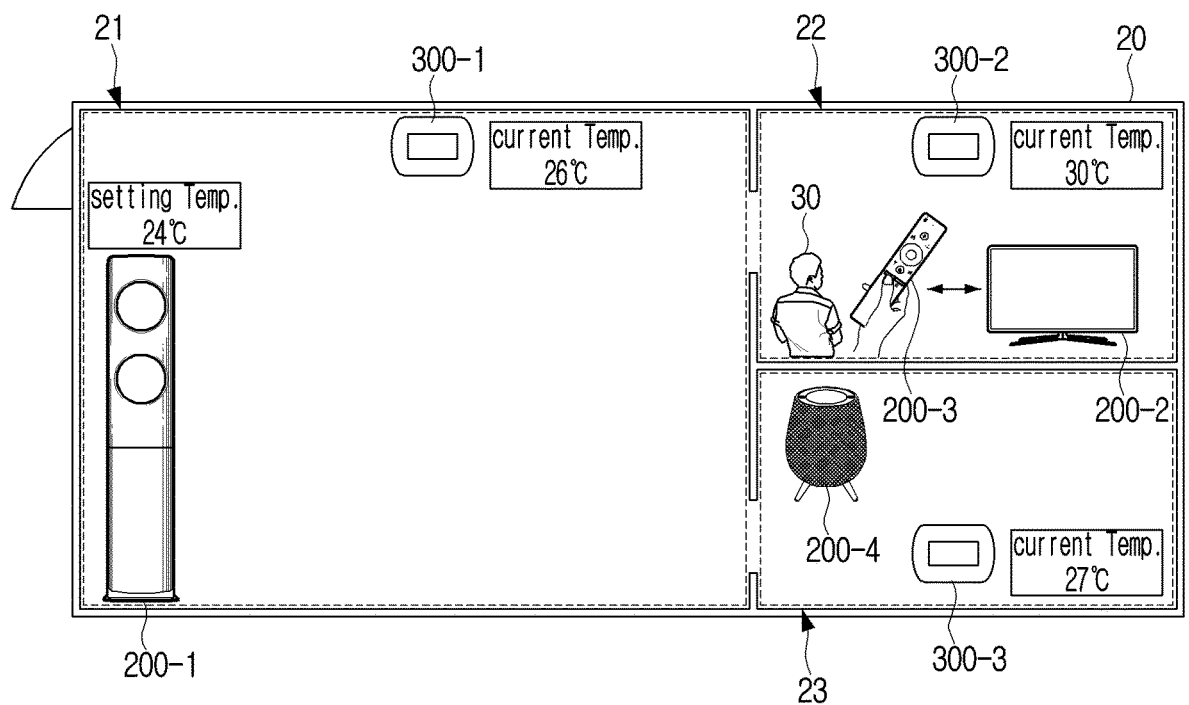
FIG. 8C illustrates a method for identifying a device based on an input user command according to an embodiment of the disclosure.
Figure 8D:
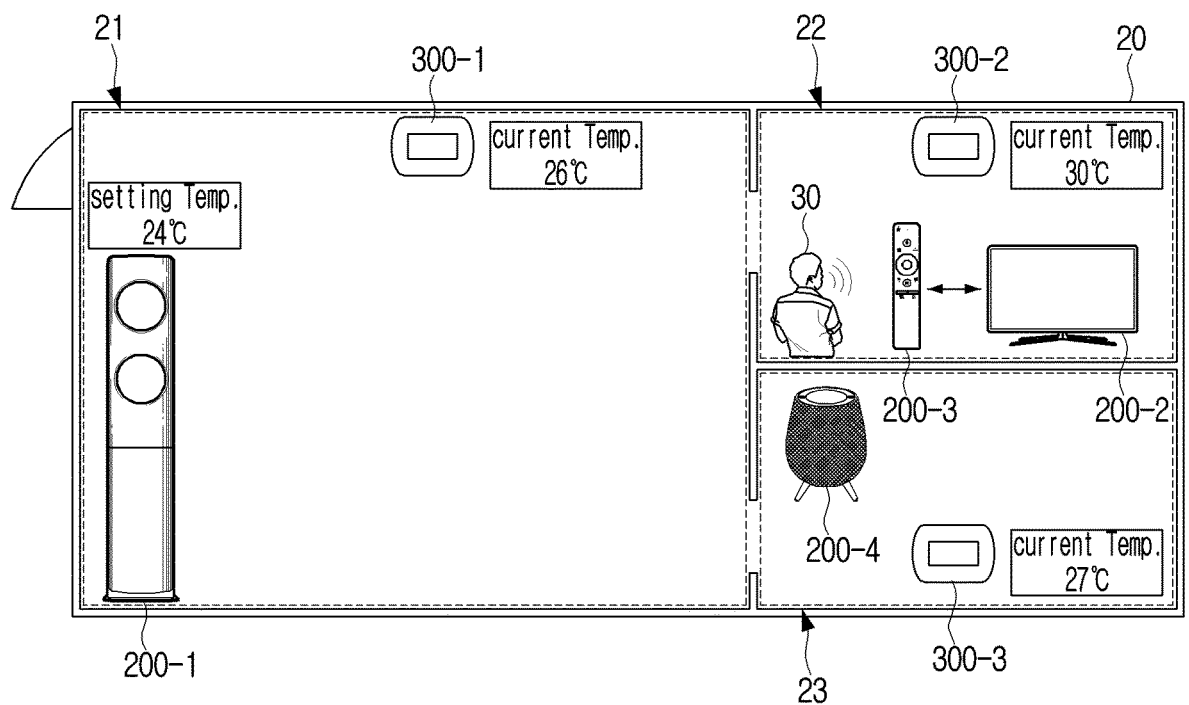
FIG. 8D illustrates a method for identifying a device based on a received user voice according to an embodiment of the disclosure.

FIGS. 8C and 8D illustrate methods for identifying a device based on a user command and a user voice according to various embodiments of the disclosure.

Referring to FIGS. 8C and 8D, the plurality of electronic devices 200 may include a first electronic device 200-1, a second electronic device 200-2, a third electronic device 200-3, and a fourth electronic device 200-4. For example, it is assumed that the first electronic device 200-1 is implemented as an air conditioner disposed in the first region 21, the second electronic device 200-2 is implemented as a TV disposed in the second region 22, the third electronic device 200-3 is implemented as a remote control for controlling the TV, disposed in the second region 22, and the fourth electronic device 200-4 is implemented as an artificial intelligence speaker disposed in the third region 23.

As shown in FIG. 8C, the user 30 may remotely control the second electronic device 200-2 through the third electronic device 200-3 performing communication, such as infrared communication with the second electronic device 200-2.

Here, in case that the user command is input to the third electronic device 200-3 while the third electronic device 200-3 is connected to the server 100 through a network, the third electronic device 200-3 may transmit state information of the third electronic device 200-3 to the server 100. The server 100 may use location information of the third electronic device 200-3 and the plurality of sensing devices 300 to identify a second sensing device 300-2 located in the same region as that of the third electronic device 200-3 that receives the state information as the sensing device corresponding to the location of the user. Here, in case that the user command is input to the third electronic device 200-3 while the third electronic device 200-3 is not connected to the server 100 through the network, the second electronic device 200-2 controlled through the third electronic device 200-3 may transmit state information of the second electronic device 200-2 to the server 100. The server 100 may use location information of the second electronic device 200-2 and the plurality of sensing devices 300 to identify a second sensing device 2 located in the same region as that of the second electronic device 200-2 that receives the state information as the sensing device corresponding to the location of the user.

Here, in case that the first electronic device 200-1 is the target electronic device, the server 100 may transmit, to the target electronic device, the signal for controlling the target electronic device to perform an operation based on the sensing data obtained from the identified second sensing device 300-2. In this case, the target electronic device may perform a cooling operation based on a set temperature (e.g., 24° C.) and sensing data (e.g., 30° C.) obtained from the second sensing device 300-2.

In case that the user 30 utters a voice as shown in FIG. 8D, an electronic device including the microphone among the plurality of electronic devices 200 may receive the user voice. For example, it is assumed that the third electronic device 200-3 and the fourth electronic device 200-4 each include the microphone as shown in FIG. 8D. In this case, a user voice having a greater signal level may be received by the third electronic device 200-3 located close to the user 30 among the third electronic device 200-3 and the fourth electronic device 200-4, and the fourth electronic device 200-4 located farther from the user 30 may receive a user voice having a smaller signal level. In this case, the third electronic device 200-3 and the fourth electronic device 200-4 may transmit information on the received user voice to the server 100. The server 100 may identify the second sensing device 300-2 located in the same region as that of the third electronic device 200-3 which is the electronic device having the user voice having the greatest signal level as the sensing device corresponding to the location of the user based on information on the user voice received from the third electronic device 200-3 and the fourth electronic device 200-4.

Here, in case that the first electronic device 200-1 is the target electronic device, the server 100 may transmit, to the target electronic device, the signal for controlling the target electronic device to perform an operation based on the sensing data obtained from the identified second sensing device 300-2. In this case, the target electronic device may perform the cooling operation based on the set temperature (e.g., 24° C.) and the sensing data (e.g., 30° C.) obtained from the second sensing device 300-2.

Figure 9A:
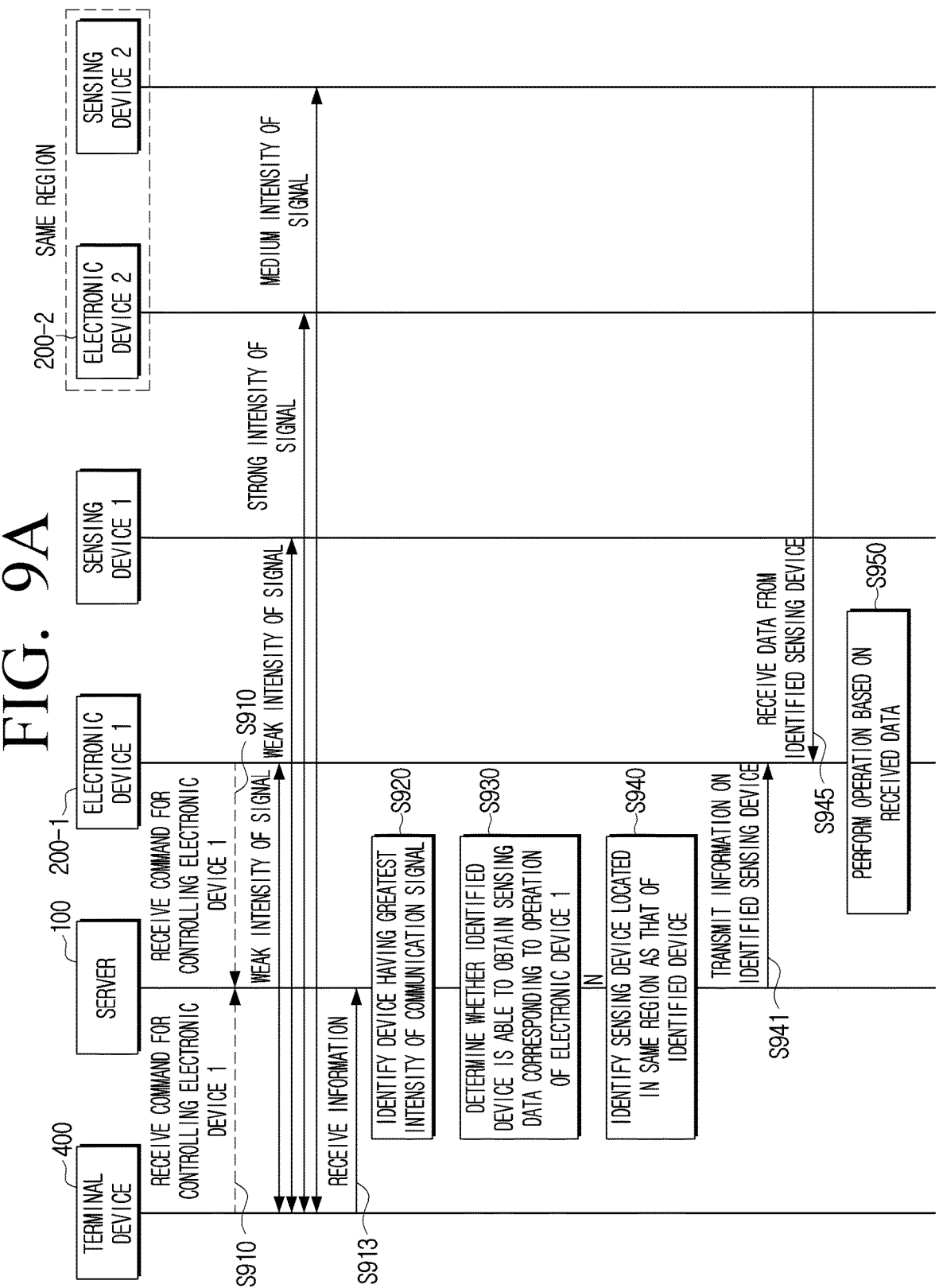
FIG. 9A illustrates a method for determining a sensing device which is a basis of an operation of a target electronic device, by using intensity of a signal according to an embodiment of the disclosure.
Figure 9C:
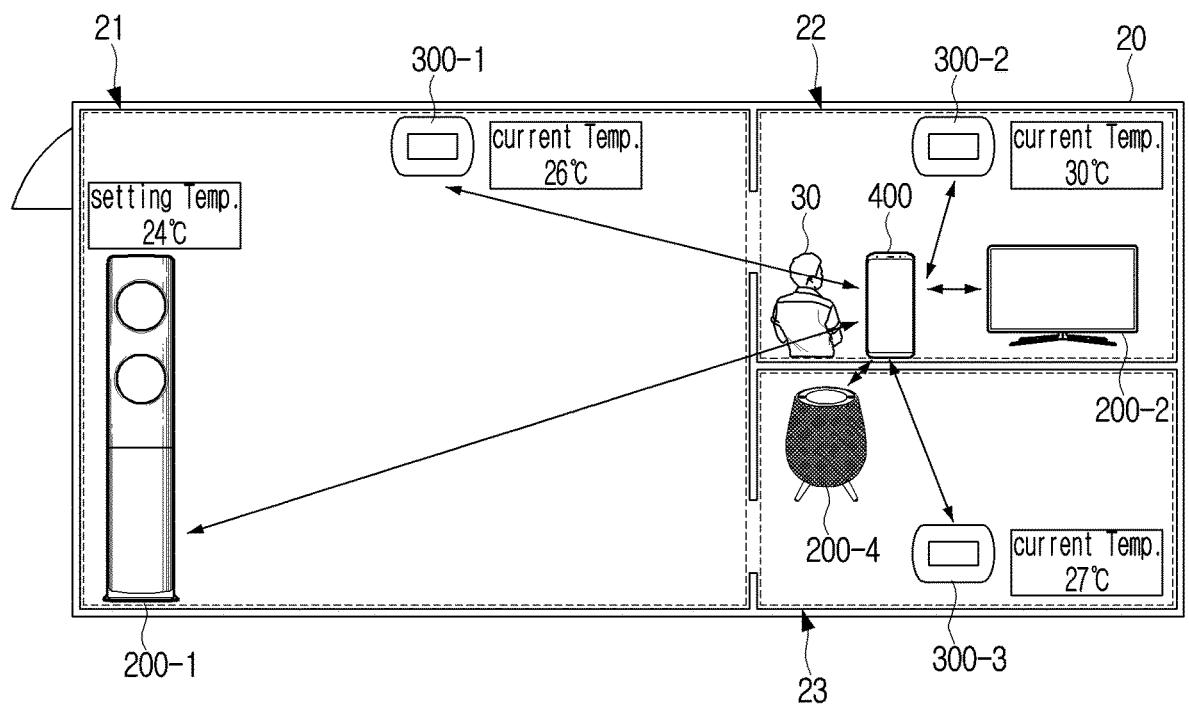
FIG. 9C illustrates a method for determining a sensing device, which is a basis of an operation of a target electronic device, by using an intensity of a signal according to an embodiment of the disclosure.

FIGS. 9A, 9B, and 9C illustrate a method for determining a sensing device which is a basis of an operation of a target electronic device, by using intensity of a signal according to various embodiments of the disclosure. Here, FIG. 9A shows a case where the electronic device is a device having the greatest intensity of a signal, and FIG. 9B shows a case where the sensing device is a device having the greatest intensity of a signal.

Referring to FIG. 9A and FIG. 9B, the processor 120 of the server 100 may control the communication interface 110 to receive a command for controlling the electronic device 1 from the user terminal device 400 or the electronic device 1 (at operation S910). Here, the electronic device 1 is referred to as the target electronic device.

The processor 120 may control the communication interface 110 to receive information on intensities of communication signals between the plurality of electronic devices 200, the plurality of sensing devices 300 and the user terminal device 400 (at operation S913). Here, the information on the intensity of the communication signal may include information on intensity of a communication signal between the user terminal device 400 and the electronic device 1, information on intensity of a communication signal between the user terminal device 400 and the electronic device 2, information on intensity of a communication signal between the user terminal device 400 and the sensing device 1, and information on intensity of a communication signal between the user terminal device 400 and the sensing device 2. In addition, the information on the intensity of the communication signal may be received from the user terminal device 400. However, this configuration is only an example, and the information on respective intensities of the communication signals may also be received from the plurality of electronic devices 200 and the plurality of sensing devices 300.

The processor 120 may identify the device having the greatest intensity of the communication signal based on the received information on the intensity of the communication signal (at operation S920). For example, as shown in FIG. 9C, the second electronic device 200-2 closest to the user terminal device 400 may have the greatest communication signal.

In this case, the processor 120 may identify a sensing device corresponding to a device identified as having the greatest intensity of the communication signal among the plurality of sensing devices 300 as the sensing device corresponding to the location of the user 30.

For example, one of the plurality of electronic devices 200 may be identified as the device having the greatest intensity of the communication signal. In this case, the processor 120 of the server 100 as shown in FIG. 9A may identify the sensing device located in the same region as that of the identified electronic device among the plurality of sensing devices 300 as the sensing device corresponding to the location of the user 30 based on the location information. For another example, as shown in FIG. 9B, one of the plurality of sensing devices 300 may be identified as having the greatest intensity of the communication signal. In this case, the processor 120 may identify the identified sensing device as the sensing device corresponding to the location of the user 30.

More particularly, the processor 120 may determine whether the device identified as having the greatest intensity of the communication signal is able to obtain the sensing data used for the operation of the target electronic device by comparing the information on the sensing data which may be obtained by the device identified as having the greatest intensity of the communication signal and the information on the sensing data requested by the target electronic device (at operation S930). The information on the sensing data which may be obtained by the identified device and the information on the sensing data requested by the target electronic device may be the information pre-stored in the server 100 or the information received from each device. For example, in a case of FIG. 9A, the processor may determine that the electronic device 2 identified as having the greatest intensity of the communication signal is unable to obtain the sensing data corresponding to the operation of the target electronic device. For another example, in a case of FIG. 9B, the processor may determine that the electronic device 2 identified as having the greatest intensity of the communication signal is able to obtain the sensing data corresponding to the operation of the target electronic device.

For example, the processor 120 may determine that the electronic device 2 identified as having the greatest intensity of the communication signal is unable to obtain the sensing data corresponding to the operation of the target electronic device as shown in FIG. 9A (N in operation S930). In this case, the processor 120 may identify the sensing device 2 located in the same region as that of the identified electronic device 2 among the plurality of sensing devices 300 as the sensing device corresponding to the location of the user 30 based on the location information (at operation S940).

For another example, the processor 120 may determine that the electronic device 2 identified as having the greatest intensity of the communication signal is able to obtain the sensing data corresponding to the operation of the target electronic device as shown in FIG. 9B (Y in operation S930). In this case, the processor 120 may identify the identified sensing device 2 as the sensing device corresponding to the location of the user 30.

The processor 120 may then perform control to transmit the information on the identified sensing device to the target electronic device (at operations S941 and S951), the target electronic device may receive the sensing data from the identified sensing device 2 (at operations S945 and S955) to perform the operation using the received sensing data (at operations S950 and S960). These steps overlap with the contents described above with reference to FIGS. 8A, 8B, 8C, and 8D, and the detailed description thereof is thus omitted.

FIG. 10 illustrates a method for determining a sensing device which is a basis of an operation of a target electronic device by using a score according to an embodiment of the disclosure.

Referring to FIG. 10, the processor 120 of the server 100 may identify the sensing device corresponding to the location of the user 30 among the plurality of sensing devices 300 based on information on the intensities of the communication signals received from the plurality of electronic devices 200 and the plurality of sensing devices 300, and the state information or the information on the user voice, received from at least one of the plurality of electronic devices 200.

More particularly, the processor 120 of the server 100 may calculate the score by applying a predetermined weight to each value corresponding to the information on the intensity of the communication signal, the state information of the electronic device or the information on the user voice, to each of the plurality of electronic devices 200 and the plurality of sensing devices 300.

Here, the value corresponding to each of the information on the intensity of the communication signal, the state information, and the information on the user voice may be a value obtained by quantifying each of the information on the intensity of the communication signal, the state information, and the information on the user voice. For example, the value corresponding to the state information may have a value of zero in case that the user command is not input, and may have a value of 1 in case that the user command is input. The value corresponding to the user voice may have a value between a minimum of zero and a maximum of 1, and may have a greater value as the signal level (or a volume of the sound) of the user voice is greater. The value corresponding to the intensity of the communication signal may have the value between the minimum of zero and the maximum of 1, and may have a greater value as the intensity of the communication signal is greater. However, this is only an example, and the intensity of the communication signal may have a value within various ranges. Each weight may be set or adjusted by a manufacturer or the user.

In addition, the score may be calculated for each of the plurality of electronic devices 200 and the plurality of sensing devices 300. For example, as shown in FIG. 10, a score $Y_1$ of the electronic device 1 may be the sum of a value obtained by multiplying a weight 1 ($W_1$) by a value ($X_{11}$) corresponding to the state information, a value obtained by multiplying a weight 2 ($W_2$) by a value ($X_{12}$) corresponding to the user voice, and a value obtained by multiplying a weight 3 ($W_3$) by a value ($X_{13}$) corresponding to the intensity of the communication signal.

In addition, the processor 120 of the server 100 may identify a device having the highest score among the plurality of electronic devices 200 and the plurality of sensing devices 300.

For example, the processor 120 may identify the sensing device located in the same region as that of an identified electronic device among the plurality of sensing devices 300 as the sensing device corresponding to the location of the user 30 based on the location information in case that one of the plurality of electronic devices 200 is identified as the device having the highest score.

On the other hand, the processor 120 of the server 100 may identify an identified sensing device as the sensing device corresponding to the location of the user 30 in case that one of the plurality of sensing devices 300 is identified as the device having the highest score.

Figure 11:
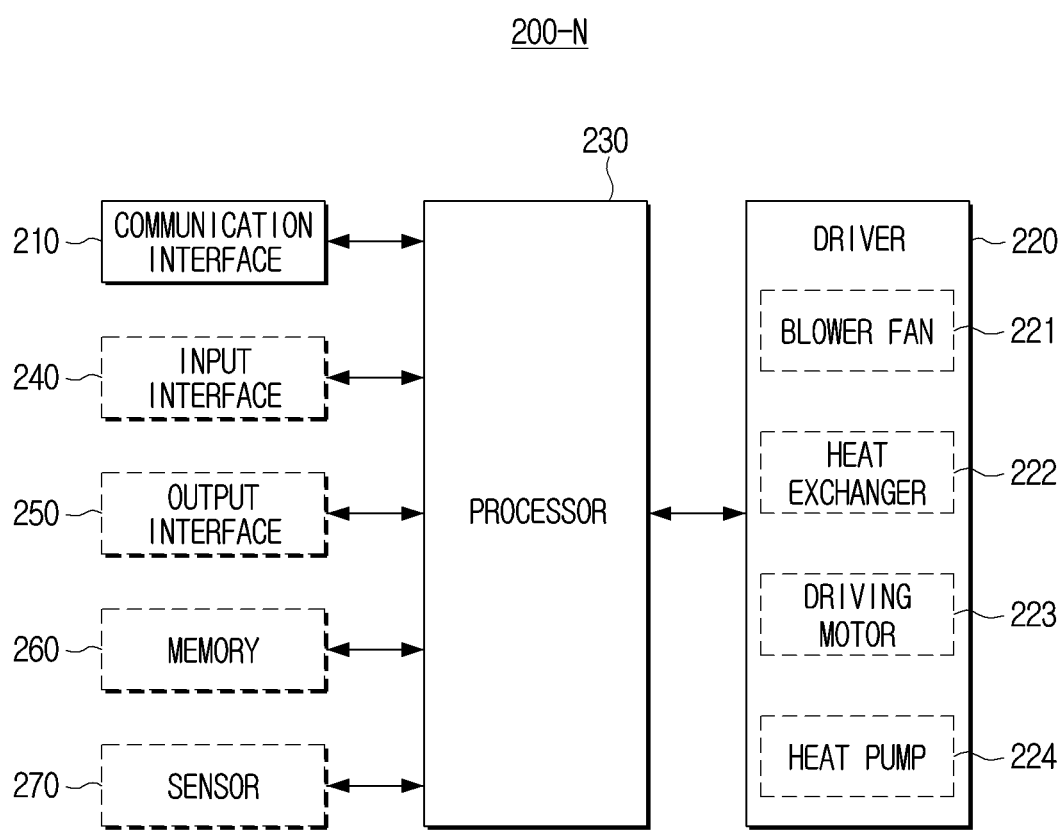
FIG. 11 is a block diagram illustrating a configuration of one electronic device among a plurality of electronic devices according to an embodiment of the disclosure.

FIG. 11 is a block diagram illustrating a configuration of one electronic device among a plurality of electronic devices according to an embodiment of the disclosure.

Referring to FIG. 11, an N-th electronic device 200-N may include a communication interface 210, a driver 220, and a processor 230. Here, the N-th electronic device 200-N may be one of the plurality of electronic devices 200. In addition, the N-th electronic device 200-N may further include at least one of an input interface 240, an output interface 250, a memory 260, and a sensor 270 in addition to the communication interface 210, the driver 220 and the processor 230. Here, the contents described with reference to FIGS. 2A and 2B may be applied to this configuration, and overlapping contents thereof are omitted.

The driver 220 may be a component which may perform a specific operation for providing the service. For example, the driver 220 may perform a variety of operations to generate cold or warm air, move the N-th electronic device 200-N, rotate the N-th electronic device 200-N, generate light, or the like. To this end, the driver 220 may include components, such as a blower fan 221, a heat exchanger 222, a driving motor 223, a heat pump 224, and the like, and this configuration may be modified to include various components based on the operation performed by the N-th electronic device 200-N or a service to be provided.

Figure 12:
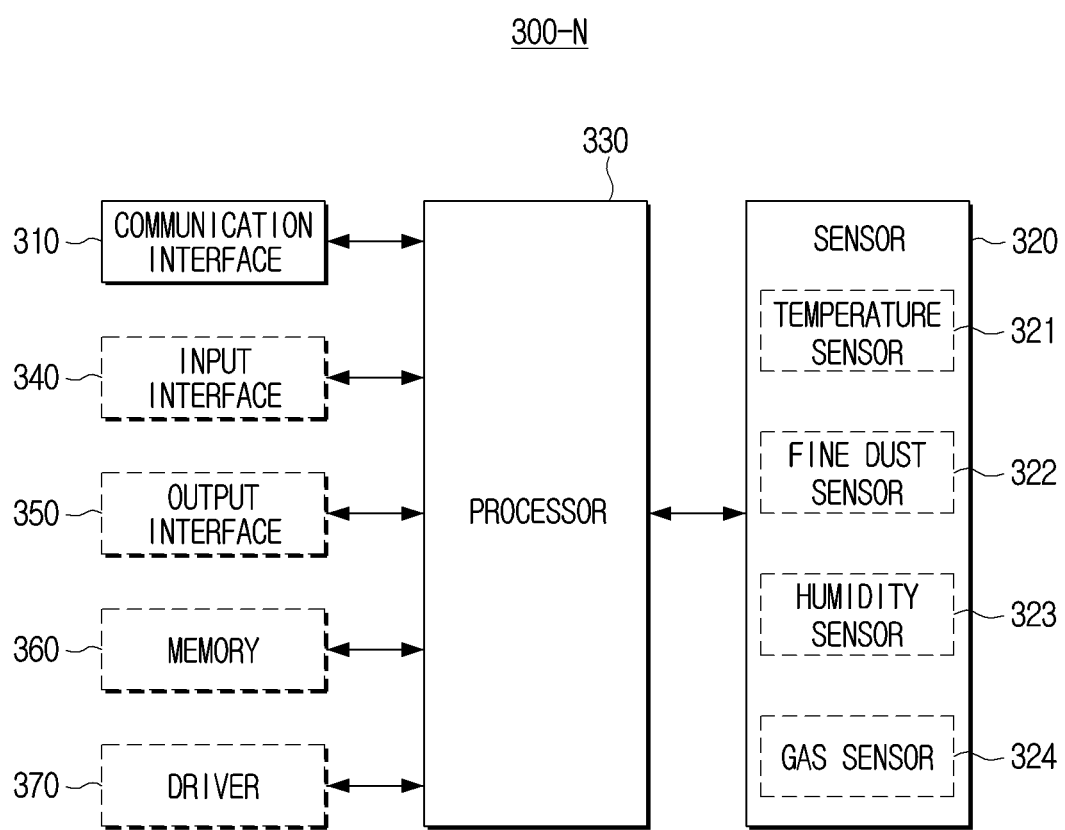
FIG. 12 is a block diagram illustrating a configuration of one of a plurality of sensing devices according to an embodiment of the disclosure.

FIG. 12 is a block diagram illustrating a configuration of one of a plurality of sensing devices according to an embodiment of the disclosure.

Referring to FIG. 12, an N-th sensing device 300-N may include a communication interface 310, a sensor 320, and a processor 330. Here, the N-th sensing device 300-N may be one of the plurality of sensing devices 300. In addition, the N-th electronic device 300-N may further include at least one of an input interface 340, an output interface 350, a memory 360, and a driver 370 in addition to the communication interface 310, the sensor 320 and the processor 330. Here, the contents described with reference to FIGS. 2A and 2B may be applied to this configuration, and overlapping contents thereof are omitted.

The sensor 320 may obtain sensing data for a surrounding environment. For example, the sensor 320 may obtain various sensing data, such as a temperature, a concentration of fine dust, humidity, a concentration of carbon dioxide, illuminance, or the like. To this end, the sensor 320 may include components, such as a temperature sensor 321, a fine dust sensor 322, a humidity sensor 323, a gas sensor 324, and the like, and this configuration may be modified to include various components based on the sensing data obtained by the N-th sensing device 300-N.

Figure 13:
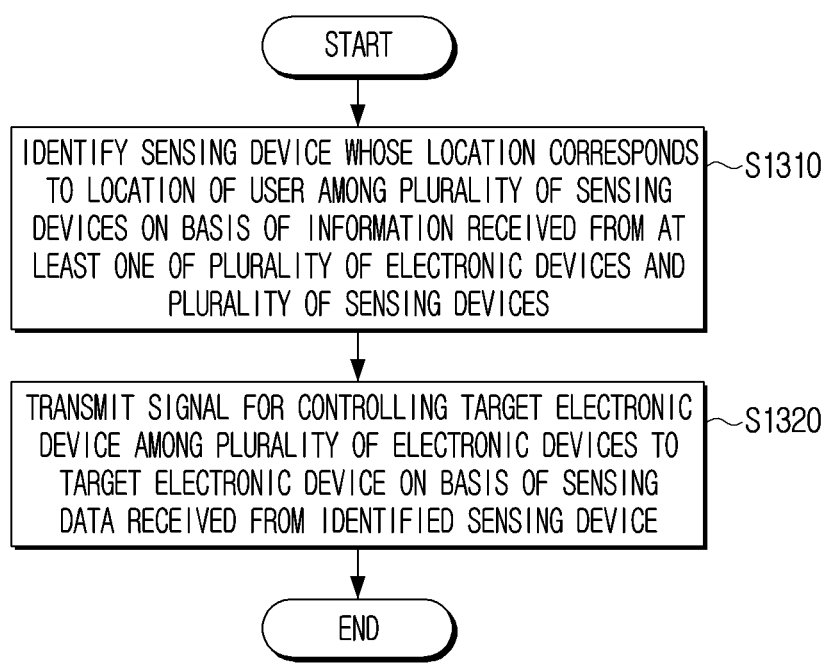
FIG. 13 illustrates a flowchart according to an embodiment of the disclosure.

FIG. 13 illustrates a flowchart according to an embodiment of the disclosure.

Referring to FIG. 13, a control method of a server 100 according to another embodiment of the disclosure may include identifying a sensing device corresponding to a location of a user 30 among the plurality of sensing devices 300 based on information received from at least one of a plurality of electronic devices 200 and the plurality of sensing devices 300 at operation S1310, and transmitting a signal for controlling a target electronic device among the plurality of electronic devices 200 to the target electronic device based on sensing data received from the identified sensing device at operation S1320.

More particularly, the sensing device corresponding to the location of the user 30 among the plurality of sensing devices 30 may be identified based on the information received from at least one of the plurality of electronic devices 200 and the plurality of sensing devices 300 at operation S1310.

Here, the sensing device corresponding to the location of the user 30 according to an embodiment of the disclosure may be a sensing device closest to the user 30 among the plurality of sensing devices 300. For example, in the identifying of the sensing device corresponding to the location of the user, the sensing device corresponding to the location of the user 30 among the plurality of sensing devices 300 may be identified as the sensing device closest to the user 30.

Meanwhile, the server 100 according to an embodiment of the disclosure may store information on locations of regions in which the plurality of electronic devices 200 and the plurality of sensing devices 300 are located at a specific place. In this case, the identifying of the sensing device may include identifying one of the plurality of electronic devices 200 based on the information received from at least one of the plurality of electronic devices 200. In addition, the identifying of the sensing device may include identifying a sensing device located in the same region as that of the identified electronic device among the plurality of sensing devices 300 as the sensing device corresponding to the location of the user 30 based on the location information.

The identifying of the sensing device according to another embodiment of the disclosure may include identifying the sensing device located in the same region as that of an electronic device that transmits its state information among the plurality of sensing devices 300 as the sensing device corresponding to the location of the user 30 in case that the state information of the electronic device is received from an electronic device controlled based on a user command among the plurality of electronic devices 200.

The identifying of the sensing device according to another embodiment of the disclosure may include identifying the sensing device located in the same region as that of an electronic device that transmits information on a user voice among the plurality of sensing devices 300 as the sensing device corresponding to the location of the user 30 in case that the information on the user voice is received from an electronic device that receives the user voice among the plurality of electronic devices 200.

The identifying of the sensing device according to another embodiment of the disclosure may include identifying a device having the greatest intensity of a communication signal based on received information on the intensity of the communication signal, and identifying a sensing device corresponding to the identified device among the plurality of sensing devices 300 as the sensing device corresponding to the location of the user 30 in case that information on the intensities of the communication signals between the plurality of electronic devices 200, the plurality of sensing devices 300 and the user terminal device 400 is received through the communication interface 110.

Here, the identifying of the sensing device may include identifying the sensing device located in the same region as that of the identified electronic device among the plurality of sensing devices 300 as the sensing device corresponding to the location of the user 30 based on the location information in case that one of the plurality of electronic devices 200 is identified as the device having the greatest intensity of the communication signal, and identifying an identified sensing device as the sensing device corresponding to the location of the user 30 in case that one of the plurality of sensing devices 300 is identified as the device having the greatest intensity of the communication signal.

The identifying of the sensing device according to another embodiment of the disclosure may include identifying the sensing device corresponding to the location of the user 30 among the plurality of sensing devices 300 based on the information on the intensities of the communication signals received from the plurality of electronic devices 200 and the plurality of sensing devices 300, and the state information or the information on the user voice, received from at least one of the plurality of electronic devices 200.

Here, in the identifying of the sensing device, it is possible to calculate a score by applying a predetermined weight to each value corresponding to the information on the intensity of the communication signal, the state information of the electronic device or the information on the user voice, to each of the plurality of electronic devices 200 and the plurality of sensing devices 300. It is also possible to identify a device having the highest score among the plurality of electronic devices 200 and the plurality of sensing devices 300.

For example, the sensing device located in the same region as that of the identified electronic device among the plurality of sensing devices 300 may be identified as the sensing device corresponding to the location of the user 30 based on the location information in case that one of the plurality of electronic devices 200 is identified as the device having the highest score. On the other hand, the identifying of the sensing device may include identifying an identified sensing device as the sensing device corresponding to the location of the user 30 in case that one of the plurality of sensing devices 300 is identified as the device having the highest score.

A signal for controlling the target electronic device may then be transmitted to the target electronic device among the plurality of electronic devices 200 based on the sensing data received from the identified sensing device at operation S1320.

Each of the plurality of sensing devices 300 according to an embodiment of the disclosure may generate the sensing data by sensing a surrounding environment of each sensing device. In this case, the transmitting may include receiving the sensing data generated by sensing the surrounding environment by the identified sensing device from the identified sensing device, and transmitting the signal for controlling a surrounding environment of the target electronic device to the target electronic device based on the received sensing data.

According to the various embodiments of the disclosure as described above, it is possible to provide the server that controls the operation of the target electronic device by using the sensing data for the environment closer to the environment of the user 30, and the control method therefor. It is thus possible to improve the satisfaction of the user 30 with respect to the service, and also to address the inconvenience of the user 30.

According to the various embodiments of the disclosure, it is also possible to detect the environment estimated to be the environment of the user 30 without accurately detecting the location of the user 30. It may thus be economical in that there is no need for a sensor device including separate hardware and software for sensing the location of the user 30, and further, it is also possible to protect the privacy of the user 30.

The various embodiments of the disclosure may be implemented by software including an instruction stored in a machine-readable storage medium (for example, a computer-readable storage medium). The machine may be a device that invokes the stored instruction from the storage medium, may be operated based on the invoked instruction, and may include the electronic device (for example, electronic device 100) according to the disclosed embodiments. In case that the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, a term "non-transitory" may only indicate that the storage medium is tangible without including a signal, and does not distinguish whether data are semi-permanently or temporarily stored in the storage medium.

The method according to the various embodiments may be provided by being included in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program product may be at least temporarily stored in a storage medium, such as a memory of a server of a manufacturer, a server of an application store or a relay server, or be temporarily provided.

Each of components (for example, modules or programs) according to the various embodiments may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner Operations performed by the modules, the programs or other components according to the various embodiments may be executed in a sequential manner, a parallel manner, an iterative manner or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
   a communication interface configured to perform communication with a plurality of electronic devices and a plurality of sensing devices; and
   at least one processor configured to:
      identify a sensing device corresponding to a location of a user among the plurality of sensing devices based on information received from the plurality of sensing devices through the communication interface and at least one of the plurality of electronic devices,
      obtain a sensing data from the identified sensing device, and
      control the communication interface to transmit a signal for controlling a target electronic device among the plurality of electronic devices to the target electronic device based on the sensing data,
   wherein the at least one processor is further configured to:
      calculate a score by applying a predetermined weight to each value corresponding to information on intensity of communication signal, state information of the target electronic device or information on a user voice, to each of the plurality of electronic devices and the plurality of sensing devices,
      identify a device having a highest score among the plurality of electronic devices and the plurality of sensing devices,
      identify a regional sensing device located in the same region as a region of the identified sensing device among the plurality of sensing devices as the sensing device corresponding to the location of the user based on location information in case that one of the plurality of electronic devices is identified as the device having the highest score, and
      identify an identified sensing device as the sensing device corresponding to the location of the user in case that one of the plurality of sensing devices is identified as the device having the highest score.

2. The server of claim 1, wherein the at least one processor is further configured to:
   transmit the signal for controlling a surrounding environment of the target electronic device to the target electronic device based on the obtained sensing data.

3. The server of claim 1, wherein the at least one processor is further configured to:
   identify the identified sensing device corresponding to the location of the user among the plurality of sensing devices as a sensing device closest to the user based on the information received from the plurality of sensing devices and the at least one of the plurality of electronic devices.

4. The server of claim 1, further comprising:
   a memory for storing information on locations of regions in which the plurality of electronic devices and the plurality of sensing devices are located at a specific place, wherein the at least one processor is further configured to:
identify the regional sensing device located in a same region as a region of the identified one of the plurality of electronic devices among the plurality of sensing devices as the identified sensing device corresponding to the location of the user based on the location information.

5. The server of claim 4, wherein the at least one processor is further configured to:
identify the regional sensing device located in the same region as a region of an electronic device that transmits the electronic device's state information among the plurality of sensing devices as the sensing device corresponding to the location of the user in case that the electronic device's state information of the electronic device is received from the electronic device controlled based on a user command among the plurality of electronic devices through the communication interface.

6. The server of claim 4, wherein the at least one processor is further configured to:
identify the regional sensing device located in the same region as an electronic device that transmits information on a user voice among the plurality of sensing devices as the sensing device corresponding to the location of the user in case that the information on the user voice is received from the electronic device that receives the user voice among the plurality of electronic devices through the communication interface.

7. The server of claim 4, wherein the at least one processor is further configured to:
identify a first device having greatest intensity of a communication signal based on received information on intensity of the communication signal, and
identify a sensing device corresponding to the identified first device among the plurality of sensing devices as the sensing device corresponding to the location of the user, in case that information on intensities of communication signals between the plurality of electronic devices, the plurality of sensing devices and a user terminal device is received through the communication interface.

8. The server of claim 7, wherein the at least one processor is further configured to:
identify the regional sensing device located in the same region as a region of an identified electronic device among the plurality of sensing devices as the sensing device corresponding to the location of the user based on the location information in case that one of the plurality of electronic devices is identified as the device having the greatest intensity of the communication signal, and
identify an identified sensing device as the sensing device corresponding to the location of the user in case that one of the plurality of sensing devices is identified as the device having the greatest intensity of the communication signal.

9. A control method for a server, the method comprising:
identifying a sensing device corresponding to a location of a user among the plurality of sensing devices based on information received from the plurality of sensing devices and at least one of a plurality of electronic devices;
obtaining a sensing data from the identified sensing device; and
transmitting a signal for controlling a target electronic device among the plurality of electronic devices to the target electronic device based on the sensing data,
wherein the identifying of the sensing device includes:
calculating a score by applying a predetermined weight to each value corresponding to information on intensity of a communication signal, a state information of the target electronic device or information on a user voice, to each of the plurality of electronic devices and the plurality of sensing devices,
identifying a device having a highest score among the plurality of electronic devices and the plurality of sensing devices,
identifying a regional sensing device located in the same region as a region of the identified sensing device among the plurality of sensing devices as the sensing device corresponding to the location of the user based on location information in case that one of the plurality of electronic devices is identified as the device having the highest score, and
identifying an identified sensing device as the sensing device corresponding to the location of the user in case that one of the plurality of sensing devices is identified as the device having the highest score.

10. The method of claim 9, wherein the transmitting includes:
transmitting the signal for controlling a surrounding environment of the target electronic device to the target electronic device based on the obtained sensing data.

11. The method of claim 9, wherein in the identifying of the sensing device, the sensing device corresponding to the location of the user among the plurality of sensing devices is identified as a sensing device closest to the user based on the information received from the plurality of sensing devices and the at least one of the plurality of electronic devices.

12. The method of claim 9, wherein the server stores information on locations of regions in which the plurality of electronic devices and the plurality of sensing devices are located at a specific place, and the identifying of the sensing device includes:
identifying one of the plurality of electronic devices based on the information received from at least one of the plurality of electronic devices, and
identifying the regional sensing device located in a same region as a region of the identified electronic device among the plurality of sensing devices as the sensing device corresponding to the location of the user based on the location information.

13. The method of claim 12, wherein the identifying of the sensing device includes identifying the regional sensing device located in the same region as that of an electronic device that transmits the electronic device's state information among the plurality of sensing devices as the sensing device corresponding to the location of the user in case that the electronic device's state information of the electronic device is received from the electronic device controlled based on a user command among the plurality of electronic devices.

14. The method of claim 12, wherein the identifying of the sensing device includes identifying the regional sensing device located in the same region as an electronic device that transmits information on a user voice among the plurality of sensing devices as the sensing device corresponding to the location of the user in case that the information on the user voice is received from the electronic device that receives the user voice among the plurality of electronic devices.

15. The method of claim 12, wherein the identifying of the sensing device includes:
- identifying a first device having greatest intensity of a communication signal based on received information on intensity of the communication signal; and
- identifying a sensing device corresponding to the identified first device among the plurality of sensing devices as the sensing device corresponding to the location of the user, in case that information on intensities of communication signals between the plurality of electronic devices, the plurality of sensing devices and a user terminal device is received.

16. The method of claim 15, wherein the identifying of the sensing device includes:
- identifying the regional sensing device located in the same region as a region of an identified electronic device among the plurality of sensing devices as the sensing device corresponding to the location of the user based on the location information in case that one of the plurality of electronic devices is identified as the device having the greatest intensity of the communication signal, and
- identifying an identified sensing device as the sensing device corresponding to the location of the user in case that one of the plurality of sensing devices is identified as the device having the greatest intensity of the communication signal.

* * * * *